(12) United States Patent
Zhao et al.

(10) Patent No.: US 12,488,736 B2
(45) Date of Patent: Dec. 2, 2025

(54) DISPLAY SUBSTRATE, MANUFACTURING METHOD THEREOF AND DISPLAY APPARATUS WITH SHARED SHIFT REGISTER UNITS

(71) Applicants: Chengdu BOE Optoelectronics Technology Co., Ltd., Sichuan (CN); BOE Technology Group Co., Ltd., Beijing (CN)

(72) Inventors: Erjin Zhao, Beijing (CN); Ziyang Yu, Beijing (CN); Tiaomei Zhang, Beijing (CN); Pan Zhao, Beijing (CN); Quanyong Gu, Beijing (CN); Wenbo Chen, Beijing (CN); Zhiliang Jiang, Beijing (CN); Gukhwan Song, Beijing (CN); Ming Hu, Beijing (CN)

(73) Assignees: CHENGDU BOE OPTOELECTRONICS TECHNOLOGY CO., LTD., Sichuan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/567,234

(22) PCT Filed: Feb. 21, 2023

(86) PCT No.: PCT/CN2023/077322
§ 371 (c)(1),
(2) Date: Dec. 5, 2023

(87) PCT Pub. No.: WO2024/174082
PCT Pub. Date: Aug. 29, 2024

(65) Prior Publication Data
US 2025/0095546 A1    Mar. 20, 2025

(51) Int. Cl.
*G09G 3/32*    (2016.01)
*G11C 19/28*   (2006.01)

(52) U.S. Cl.
CPC .............. *G09G 3/32* (2013.01); *G11C 19/28* (2013.01); *G09G 2310/0267* (2013.01);
(Continued)

(58) Field of Classification Search
CPC ............ G09G 3/32; G09G 2310/0267; G09G 2310/0286; G09G 2310/061;
(Continued)

(56) References Cited

U.S. PATENT DOCUMENTS

2020/0394976 A1    12/2020  Takeuchi et al.
2022/0319434 A1*   10/2022  Yu ........................ G09G 3/3266
2024/0172508 A1*    5/2024  Xu ........................ G09G 3/3233

FOREIGN PATENT DOCUMENTS

CN    104867446 A    8/2015
CN    105655348 A    6/2016
(Continued)

*Primary Examiner* — Stephen G Sherman
(74) *Attorney, Agent, or Firm* — Nath, Goldberg & Meyer; Joshua B. Goldberg

(57) ABSTRACT

A display substrate, a manufacturing method thereof and a display apparatus are provided. The display substrate includes a display region including N pixel groups in a first direction and a peripheral region; each pixel group includes at least one row of pixel regions; the display substrate includes: first and second reset lines; wherein each row of pixel regions corresponds to one first reset line and one second reset line; (N+M) first shift register units are arranged along the first direction; an output terminal of an ith first shift register unit is connected to a second reset line corresponding to an (i−M)th row of pixel regions; an output terminal of a jth first shift register unit is connected to a first reset line corresponding to a jth row of pixel regions through a signal transmission line; N is an integer greater than 2, M
(Continued)

is a preset positive integer, $M+1 \leq i \leq N+M$, $1 \leq j \leq N$, and i and j are both integers; orthographic projections of the signal transmission line and at least one of the first shift register units on the base substrate overlaps with each other.

20 Claims, 16 Drawing Sheets

(52) U.S. Cl.
    CPC ............... *G09G 2310/0286* (2013.01); *G09G 2310/061* (2013.01); *G09G 2310/08* (2013.01)
(58) Field of Classification Search
    CPC .... G09G 2310/08; G09G 3/20; G09G 3/3266; G11C 19/28
    See application file for complete search history.

(56) References Cited

FOREIGN PATENT DOCUMENTS

| | | | | | |
|---|---|---|---|---|---|
| CN | 107561799 | A | | 1/2018 | |
| CN | 108630144 | A | | 10/2018 | |
| CN | 108922474 | A | | 11/2018 | |
| CN | 111445824 | A | | 7/2020 | |
| CN | 113471225 | A | * | 10/2021 | ......... G02F 1/13306 |
| CN | 113781913 | A | | 12/2021 | |
| CN | 114005411 | A | | 2/2022 | |
| CN | 114255703 | A | | 3/2022 | |
| CN | 114446255 | A | | 5/2022 | |
| CN | 114822411 | A | * | 7/2022 | |
| CN | 217306504 | U | | 8/2022 | |
| CN | 115064115 | A | | 9/2022 | |
| CN | 115206997 | A | | 10/2022 | |
| KR | 20060009749 | A | | 2/2006 | |
| WO | 2022160888 | A1 | | 8/2022 | |

* cited by examiner ly connected to the (i–M)$^{th}$ row of pixel regions; an output terminal of the j$^{th}$ first shift register unit is connected to a first reset line corresponding to the j$^{th}$ row of pixel regions through a signal transmission line; N is an integer greater than 2, M is a preset positive integer, M+1≤i≤N+M, 1≤j≤N, and i and j are both integers; wherein an orthographic projection of the signal transmission line on the base substrate overlaps with an orthographic projection of at least one first shift register unit on the base substrate.

DISPLAY SUBSTRATE, MANUFACTURING METHOD THEREOF AND DISPLAY APPARATUS WITH SHARED SHIFT REGISTER UNITS

This is a National Phase Application filed under 35 U.S.C. 371 as a national stage of PCT/CN2023/077322, filed Feb. 21, 2023, the content of which is hereby incorporated by reference in its entirety.

TECHNICAL FIELD

The present disclosure relates to the field of display technology, and in particular to a display substrate, a method for manufacturing a display substrate and a display apparatus.

BACKGROUND

Driving circuits are provided in a peripheral region of a display substrate and configured to provide driving signals to a plurality of pixel units in a display region. The plurality of pixel units are provided in the display region of the display apparatus, and each pixel unit includes a pixel circuit. Each pixel circuit is electrically connected to the driving circuit in the peripheral region, and the driving circuit provides scanning signals and light-emitting control signals for the pixel circuit, so as to control the pixel circuit to provide a driving current for a light-emitting device.

SUMMARY

The present disclosure provides a display substrate, including a display region and a peripheral region, wherein the display region includes N pixel groups in a first direction; each pixel group includes at least one row of pixel regions; the display substrate includes: a base substrate; a plurality of first reset lines and a plurality of second reset lines on the base substrate; wherein each row of pixel regions corresponds to one first reset line and one second reset line; and (N+M) first shift register units on the base substrate and in the peripheral region and arranged along the first direction, wherein an output terminal of the i$^{th}$ first shift register unit is connected to a second reset line correspond- In some embodiments, each first shift register unit includes: an output transistor connected to an output terminal of the first shift register unit, and the orthographic projection of the signal transmission line on the base substrate overlaps with an orthographic projection of the output transistor of at least one first shift register unit on the base substrate.

In some embodiments, an orthographic projection of each signal transmission line on the base substrate overlaps with an orthographic projection of (M–1) first shift register units on the base substrate.

In some embodiments, each first shift register unit includes a storage capacitor, and an orthographic projection of the signal transmission line on the base substrate does not overlap with an orthographic projection of the storage capacitor on the base substrate.

In some embodiments, each signal transmission line includes a plurality of transmission line segments extending in the first direction and a connecting line segment between two adjacent transmission line segments; and each signal transmission line includes a head end and a tail end, the head end is connected to the output terminal of the first shift register unit, and the tail end is connected to a reset line; for two adjacent transmission line segments in the same signal transmission line, a distance from a transmission line segment close to the head end to the display region is greater than a distance from a transmission line segment far from the head end to the display region.

In some embodiments, each connecting line segment is a straight line segment, and there is an obtuse angle between each connecting line segment and the transmission line segment adjacent to the connecting line segment.

In some embodiments, the connecting line segments in the signal transmission lines connected to the plurality of first shift register units are divided into a plurality of first line segment groups arranged along the first direction; at least one first line segment group includes (M–1) connecting line segments; wherein central connecting lines of the (M–1) connecting line segments are on the same straight line, and extending directions of the central connecting lines intersect with the first direction and extending directions of the first reset lines; or the central connecting lines of the (M–1) connecting line segments are on the same straight line.

In some embodiments, the central connecting lines of the (M–1) connecting line segments are on the same straight line, and the central connecting lines and the connecting line segments are inclined in different directions.

In some embodiments, the (M–1) connecting line segments are the same in length; or at least two of the connecting line segments are of different lengths.

In some embodiments, the transmission line segments in the signal transmission lines connected to the plurality of first shift register units are divided into a plurality of second line segment groups arranged along the second direction; each second line segment group includes a plurality of transmission line segments arranged along the first direction, and the transmission line segments in the same second line segment group are on the same straight line.

In some embodiments, a distance between every two adjacent second line segment groups is constant.

In some embodiments, the display substrate further includes: a plurality of scan lines, wherein each row of pixel regions corresponds to one scan line; a plurality of second shift register units in the peripheral region, wherein an output terminal of each second shift register unit is connected to one scan line; and a power line, wherein an orthographic projection of the power line on the base substrate overlaps with an orthographic projection of the plurality of second shift register units on the base substrate.

In some embodiments, the plurality of second shift register units are on a side of the plurality of first shift register units close to the display region.

In some embodiments, the display substrate further includes: a plurality of driving signal lines configured to provide signals for the plurality of first shift register units, wherein an orthographic projection of at least one of the plurality of driving signal lines on the base substrate overlaps with an orthographic projection of the plurality of first shift register units on the base substrate.

In some embodiments, an orthographic projection of the plurality of driving signal lines on the base substrate do not overlap with an orthographic projection of the signal transmission lines on the base substrate.

In some embodiments, at least one driving signal line is in a same layer as the signal transmission lines.

In some embodiments, the display substrate further includes: a plurality of connecting lines; wherein each connecting line corresponds to one first shift register unit, and the first shift register unit is connected to the second reset line through a corresponding connecting line; except for the first shift register unit in the last stage, each of the first shift register units is connected to an input terminal of the first shift register unit in the next stage through a corresponding connecting line; and a plurality of first adapters; wherein each first adapter corresponds to one signal transmission line, one end of the first adapter is connected to the connecting line through a first via, and the other end of the first adapter is connected to the signal transmission line through a second via.

In some embodiments, each first shift register unit includes a plurality of transistors, and an orthographic projection of each of the first via and the second via on the base substrate does not overlap with an orthographic projection of the plurality of transistors on the base substrate.

In some embodiments, the plurality of first adapters are arranged along the first direction.

In some embodiments, the plurality of connecting lines and the second reset lines are in the same layer and electrically connected to each other.

In some embodiments, the signal transmission lines are on a side of a layer where the plurality of first adapters are located away from the base substrate.

In some embodiments, the display substrate further includes: a second adaptor, wherein one end of the second adaptor is connected to the signal transmission line through a third via, and the other end of the second adaptor is connected to the first reset line through a fourth via; wherein each first shift register unit includes a plurality of transistors, and orthographic projections of the third vias and the fourth vias on the base substrate do not overlap with orthographic projections of the plurality of transistors on the base substrate.

In some embodiments, the plurality of second adapters are arranged along the first direction.

The embodiments of the present disclosure further provide a display apparatus, which includes the display substrate.

The embodiments of the present disclosure further provide a method for manufacturing a display substrate, wherein the display substrate includes a display region and a peripheral region, the display region includes N rows of pixel regions arranged along a first direction, wherein the method includes: forming a plurality of first reset lines and a plurality of second reset lines on a base substrate, wherein each row of pixel regions corresponds to one first reset line and one second reset line; and forming (N+M) first shift register units on the base substrate at a position corresponding to the peripheral region; wherein the (N+M) first shift register units are arranged along the first direction, and an output terminal of the $i^{th}$ first shift register unit is connected to a second reset line corresponding to the $(i-M)^{th}$ row of pixel regions; an output terminal of the $j^{th}$ first shift register unit is connected to a first reset line corresponding to the $j^{th}$ row of pixel regions through a signal transmission line; N is an integer greater than 2, M is a preset positive integer, $M+1 \leq i \leq N+M$, $1 \leq j \leq N$, and i and j are integers; and wherein an orthographic projection of the signal transmission line on the base substrate overlaps with an orthographic projection of at least one first shift register unit on the base substrate.

In some embodiments, the method further includes: forming a plurality of driving signal lines for providing signals for the plurality of first shift register units, wherein an orthographic projection of at least one of the plurality of driving signal lines on the base substrate overlaps with orthographic projections of the plurality of first shift register units on the base substrate; wherein at least one of the plurality of driving signal lines and the signal transmission line are simultaneously formed.

BRIEF DESCRIPTION OF DRAWINGS

The accompanying drawings, which are provided for further understanding of the present disclosure and constitute a part of this specification, are for explaining the present disclosure together with the embodiments of the present disclosure, but are not intended to limit the present disclosure. In the drawings.

DETAIL DESCRIPTION OF EMBODIMENTS

Figure 1:
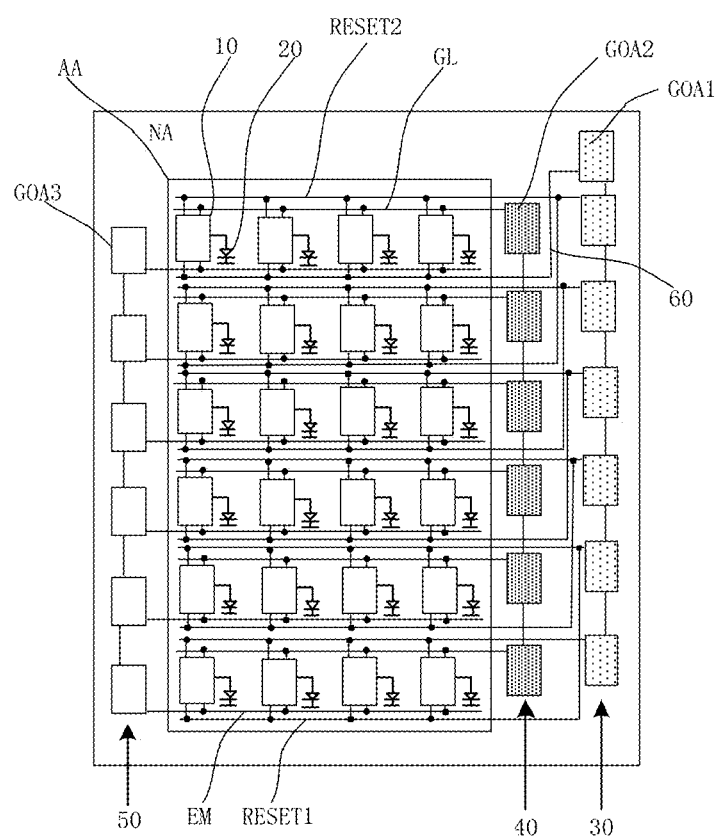
FIG. 1 is a plan view of a display substrate according to some embodiments.

The detail description of embodiments of the present disclosure will be described in detail below with reference to the accompanying drawings. It should be understood that the detailed description of embodiments described here is only used to illustrate and explain the present disclosure, not to limit the present disclosure.

To make the objects, technical solutions and advantages of the embodiments of the present disclosure more apparent, the technical solution of the embodiments of the present disclosure will be clearly and completely described below with reference to the drawings of the embodiments of the present disclosure. It is to be understood that the described embodiments are only a few, not all of, embodiments of the present disclosure. All other embodiments, which can be derived by a person skilled in the art from the described embodiments of the present disclosure without any inventive step, are within the scope of the present disclosure.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. The term "comprising", "including", or the like means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

It should be noted that a layer is schematic in the embodiments of the present disclosure and does not represent an actual thickness of the layer.

It should be further noted that "disposed in the same layer" in the embodiments of the present disclosure means that two or more structures are formed by the same material layer through a single patterning process, and therefore the two or more structures are located in the same layer in a layer-to-layer relationship; which does not mean that a distance between each of the two or more structures and a base substrate 100 is necessarily constant.

In addition, transistors involved in the embodiments of the present disclosure may be independently selected from one of a polycrystalline silicon thin film transistor, an amorphous silicon thin film transistor, an oxide thin film transistor, and an organic thin film transistor. A "first electrode" in the present disclosure specifically refers to a source electrode of a transistor and correspondingly, a "second electrode" specifically refers to a drain electrode of the transistor. Alternatively, one skilled in the art will recognize that the "first electrode" and the "second electrode" are interchangeable. In addition, the transistors are divided into N-type transistors and P-type transistors; and an operating level signal in the embodiments of the present disclosure refers to a signal capable of controlling the transistor to be turned on; a non-operating level signal refers to a signal capable of controlling the transistor to be turned off. For the N-type transistor, the operating level signal is a high level signal, and the non-operating level signal is a low level signal; for the P-type transistor, the operating level signal is a low level signal, and the non-operating level signal is a high level signal.

FIG. 1 is a plan view of a display substrate according to some embodiments. As shown in FIG. 1, the display substrate includes a display region AA and a peripheral region NA located at a periphery of the display region AA; the display region AA includes a plurality of pixel regions arranged in an array, and each pixel region is provided with a light emitting device 20 and a pixel circuit 10 for providing a driving current to the light emitting device 20.

Figure 2:
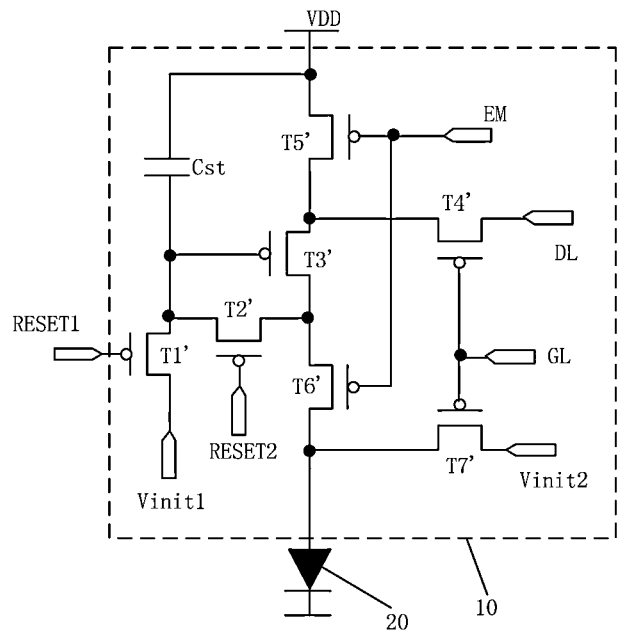
FIG. 2 is a circuit schematic diagram of a pixel circuit and a light emitting device according to some embodiments.

FIG. 2 is a circuit schematic diagram of a pixel circuit and a light emitting device according to some embodiments. As shown in FIG. 2, the pixel circuit 10 includes: a first reset transistor T1', a second reset transistor T7', a driving transistor T3', a data writing transistor T4', a first light emitting control transistor T5', a second light emitting control transistor T6', a compensation transistor T2', and a storage capacitor Cst. Both terminals of the storage capacitor Cst are respectively connected to a first power line VDD and a gate electrode of the driving transistor T3'. A gate electrode of the first reset transistor T1' is connected to a first reset line RESET1, a first electrode of the first reset transistor T1' is connected to the gate electrode of the driving transistor T3', and a second electrode of the first reset transistor T1' is connected to a first initialization signal line Vinit1. A gate electrode of the second reset transistor T7' is connected to a gate line, a first electrode of the second reset transistor T7' is connected to a first electrode of the light emitting device 20, and a second electrode of the second reset transistor T7' is connected to a second initialization signal line Vinit2. A gate electrode of the data writing transistor T4' is connected to a scan line GL, a first electrode of the data writing transistor T4' is connected to the first electrode of the driving transistor T3', and a second electrode of the data writing transistor T4' is connected to a data line. A gate electrode of the compensation transistor T2' is connected to a second reset line RESET2, a first electrode of the compensation transistor T2' is connected to the gate electrode of the driving transistor T3', and a second electrode of the compensation transistor T2' is connected to the second electrode of the driving transistor T3'. A gate electrode of the first light emitting control transistor T5' is connected to a light emitting control line EM, a first electrode of the first light emitting control transistor T5' is connected to the first power line VDD, and a second electrode of the first light emitting control transistor T5' is connected to the first electrode of the driving transistor T3'. A gate electrode of the second light emitting control transistor T6' is connected to the light emitting control line EM, a first electrode of the second light emitting control transistor T6' is connected to the second electrode of the driving transistor T3', and a second electrode of the second light emitting control transistor T6' is connected to the first electrode of the light emitting device 20. A second electrode of the light emitting device 20 is connected to a second power line VSS. The first electrode of the light emitting device 20 may be an anode and the second electrode of the light emitting device 20 may be a cathode.

The first reset transistors T1' in the pixel circuits 10 in the same row are connected to the same first reset line RESET1; the compensation transistors T2' in the pixel circuits 10 in the same row are connected to the same second reset line RESET2; the first light emitting control transistors T5' and the second light emitting control transistors T6' in the pixel circuits 10 in the same row are connected to the same light emitting control line EM; the data writing transistors T4' in the pixel circuits 10 in the same row are connected to the same scan line GL, and the data writing transistors T4' in the pixel circuits 10 in the same column are connected to the same data line DL.

Figure 3:
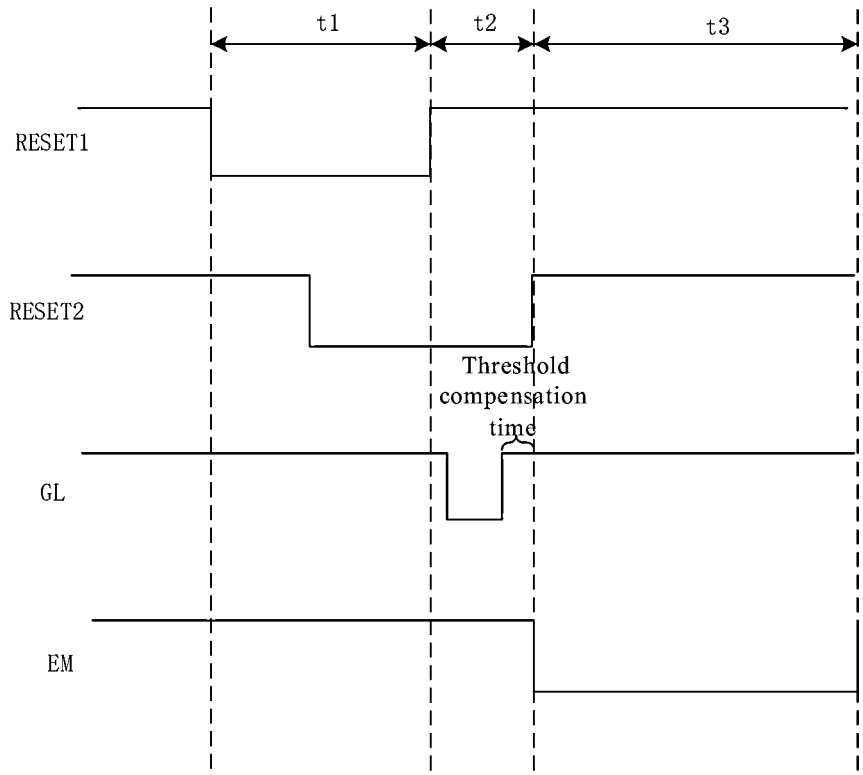
FIG. 3 is a timing diagram for the pixel circuit in FIG. 2.

In one example, each transistor in the pixel circuit 10 shown in FIG. 2 is a P-type transistor, and therefore, each transistor is controlled through a low level signal to be turned on. FIG. 3 is a timing diagram of the pixel circuit in FIG. 2. As shown in FIG. 3, the operation of the pixel circuit 10 includes: a reset phase t1, a data writing and compensating phase t2, and a light emitting phase t3. In the reset phase t1, the first reset line RESET1 provides a low level signal, thereby controlling the first reset transistor T1' to be turned on; the second reset line RESET2 then provides a low level signal to control the compensation transistor T2' to be turned on. In the data writing and compensating phase t2, the scan line GL and the second reset line RESET2 provide low level signals, so as to control the data writing transistor T4' and the compensation transistor T2' to be turned on, and a data signal on the data line DL and a threshold voltage of the driving transistor T3' are written into the storage capacitor Cst. In the light emitting phase t3, a signal on the light emitting control line EM is a low level signal, so as to control the first light emitting control transistor T5' and the second light emitting control transistor T6' to be turned on, and the driving transistor T3' provides a driving current for the light emitting device.

A time between a rising edge of a signal on the scan line GL and the light emitting phase t3 is a threshold compensation time.

It should be noted that the pixel circuit 10 in FIG. 2 is only exemplary, and in other examples, the pixel circuit may have other structure, such as 8T1C.

As shown in FIG. 1, a first driving circuit 30, a second driving circuit 40 and a third driving circuit 50 are provided in the peripheral region NA, wherein the first driving circuit 30 includes a plurality of cascaded first shift register units GOA1, the second driving circuit 40 includes a plurality of cascaded second shift register units GOA2, and the third driving circuit 50 includes a plurality of cascaded third shift register units GOA3. Each third shift register unit GOA3 is connected to one light emitting control line EM, each second shift register unit GOA2 is connected to one scan line GL, and each first shift register unit GOA1 is connected to one first reset line RESET1 and one second reset line RESET2. For example, the display region AA includes N rows of pixel regions, and the first driving circuit 30 includes (N+M) cascaded first shift register units GOA1, wherein the $i^{th}$ first shift register unit GOA1 is connected to the second reset line RESET2 corresponding to the $(i-M)^{th}$ row of pixel regions; the $j^{th}$ first shift register unit GOA1 is connected to the first reset line RESET1 corresponding to the $j^{th}$ row of pixel regions through a signal transmission line 60; N is an integer greater than 2, M is a preset positive integer, $M+1 \leq i \leq N+M$, $1 \leq j \leq N$ and i and j are integers. In this way, all of the first reset lines RESET1 and the second reset lines RESET2 are controlled by the same driving circuit, which is advantageous to reduce a frame width of the display product. Further, it is more advantageous with the greater M to increase the threshold compensation time, thereby improving the image quality.

Assuming that M=2 and N=2480, the number of first shift register units GOA1 is 2482. The $1^{st}$ first shift register unit GOA1 is connected to the first reset line RESET1 corresponding to the first row of pixel regions through the signal transmission line 60, and the $2^{nd}$ first shift register unit GOA1 is connected to the first reset line RESET1 corresponding to the second row of pixel regions through the signal transmission line 60; the $3^{rd}$ first shift register unit GOA1 is connected to the second reset line RESET2 corresponding to the first row of pixel regions, and is connected to the first reset line RESET1 corresponding to the third row of pixel regions through the signal transmission line 60; the $4^{th}$ first shift register unit GOA1 is connected to the second reset line RESET2 corresponding to the second row of pixel regions, and is connected to the first reset line RESET1 corresponding to the fourth row of pixel regions through the signal transmission line 60; in a similar fashion, the $2481^{th}$ first shift register unit GOA1 is connected to the second reset line RESET2 corresponding to the $2479^{th}$ row of pixel regions, and is connected to the first reset line RESET1 corresponding to the $2480^{th}$ row of pixel regions through the signal transmission line 60; the $2481^{th}$ first shift register unit GOA1 is connected to the second reset line RESET2 corresponding to the $2480^{th}$ row of pixel regions.

It should be noted that in the present disclosure, the first shift register unit GOA1 is connected to the first reset line RESET1 (or the second reset line RESET2), which means that an output terminal of the first shift register unit GOA1 is connected to the first reset line RESET1 (or the second reset line RESET2).

It should be noted that in the embodiments of the present disclosure, the plurality of rows of pixel regions are scanned row by row, for display row by row, where the "$n^{th}$ row" and the "$n^{th}$ item" refer to an $n^{th}$ row and an $n^{th}$ item arranged along the scanning direction, respectively.

Figure 4:
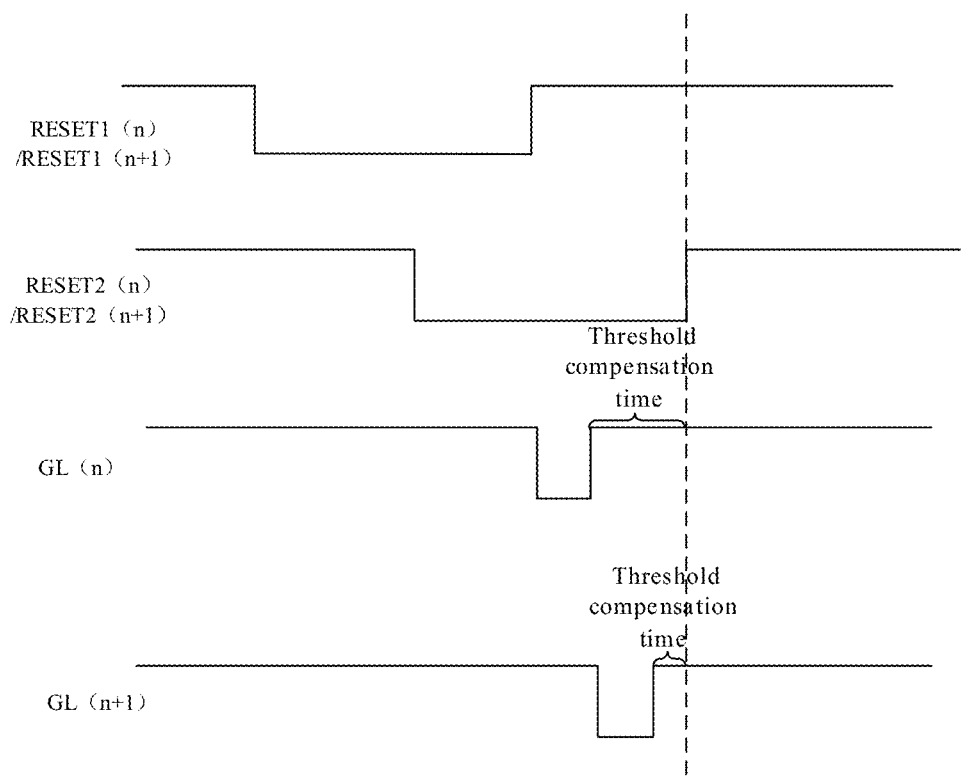
FIG. 4 is a timing diagram of a part of signals for pixel circuits in an $n^{th}$ row and in an $(n+1)^{th}$ row.

In the above embodiments, the first reset lines RESET1 corresponding to different rows of pixel regions are connected to different first shift register units GOA1, and the second reset lines RESET2 corresponding to different rows of pixel regions are connected to different first shift register units GOA1. The structure in such the connection manner is called as a "one driving one" structure. In other embodiments, two first reset lines RESET1 corresponding to every two rows of pixel regions are connected to the same first shift register unit GOA1, and two second reset lines RESET2 corresponding to every two rows of pixel regions are connected to the same first shift register unit GOA1. The structure in such the connection manner is called as a "one driving two" structure. With the "one driving two" structure, assuming that two first reset lines RESET1 corresponding to the $n^{th}$ and $(n+1)^{th}$ rows of the pixel regions are connected to the same first shift register unit GOA1, and two second reset lines RESET2 corresponding to the $n^{th}$ and $(n+1)^{th}$ rows of the pixel regions are connected to the same first shift register unit GOA1, some signals of pixel circuits in an $n^{th}$ row and in an $(n+1)^{th}$ row have timings as shown in FIG. 4. As shown in FIG. 4, a difference between a threshold compensation time of the pixel circuits 10 in the $n^{th}$ row and a threshold compensation time of the pixel circuits 10 in the $(n+1)^{th}$ row is great, which may cause a significant difference in the display of the odd-numbered of pixel regions and the even-numbered rows of pixel regions.

In order to reduce the display difference between two adjacent rows of pixel regions, in some embodiments, the rows of pixel regions are divided into pixel groups. When the "one driving one" structure is adopted, each pixel group includes two rows of pixel regions, and the $i^{th}$ first shift register unit GOA1 is connected to the second reset line RESET2 corresponding to the $(i-M)^{th}$ pixel group; the $j^{th}$ first shift register unit GOA1 is connected to the first reset line RESET1 corresponding to the $j^{th}$ pixel group through the signal transmission line 60; N is an integer greater than 2, M is a preset positive integer, $M+1 \leq i \leq N+M$, $1 \leq j \leq N$, and i and j are integers. The M may be set to an integer greater than 1, such as 7 or 8, in order to increase the threshold compensation time of the pixel circuits 10 in each row, thereby reducing the display difference of the odd-numbered of pixel regions and the even-numbered rows of pixel regions.

However, no matter the "one driving one" structure or the "one driving two" structure is adopted, the output terminal of the first shift register unit GOA1 is connected to the first reset line RESET1 necessarily through the signal transmission line 60 disposed between the first driving circuit 30 and the display region AA, and the signal transmission line 60 has a width, and it is necessary to provide a certain gap between different signal transmission lines 60, so that the signal transmission lines 60 are provided with a great M, which will increase the frame width of the display product, and is not advantageous to realize a narrow frame.

Figure 5:
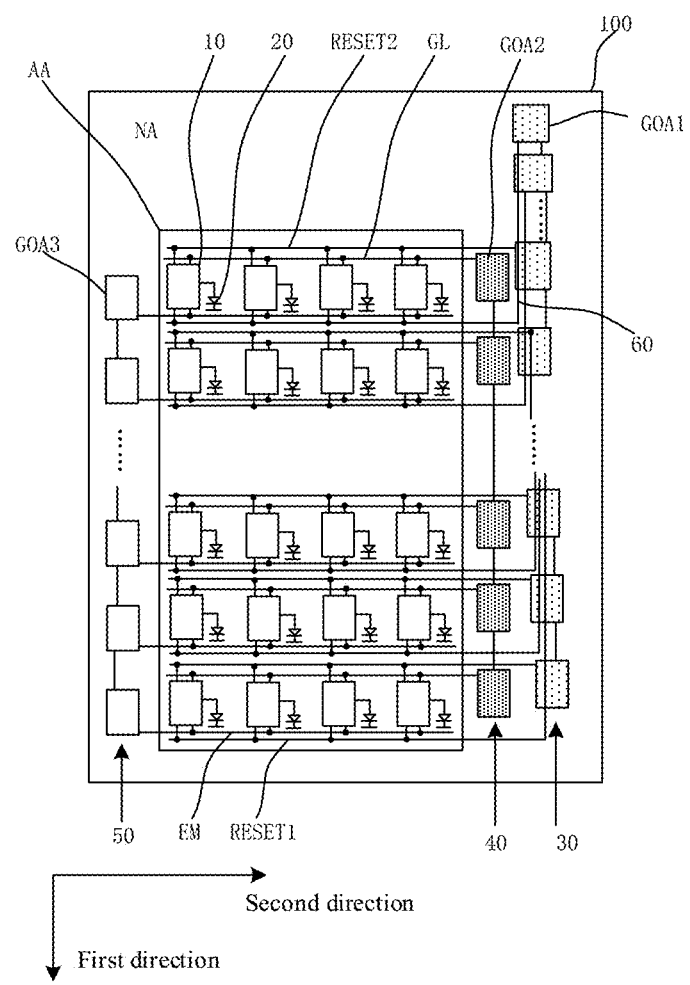
FIG. 5 is a plan view of a display substrate according to some embodiments of the present disclosure.

FIG. 5 is a plan view of a display substrate according to some embodiments of the present disclosure. As shown in FIG. 5, the display substrate includes: the display region AA and the peripheral region NA; the display region AA includes N pixel groups arranged along a first direction, each pixel group includes at least one row of pixel regions, and each pixel region includes a plurality of pixel regions arranged along a second direction. The display substrate includes a base substrate 100, and a plurality of first reset lines RESET1, a plurality of second reset lines RESET2, and (N+M) first shift register units GOA1 disposed on the base substrate 100.

At least a part of the first reset lines RESET1 and the second reset lines RESET2 are located in the display region, and each row of pixel regions corresponds to one first reset line RESET1 and one second reset line RESET2. The (N+M) first shift register units GOA1 are located in the peripheral region NA, and arranged along the first direction, wherein an output terminal of the $i^{th}$ first shift register unit GOA1 is connected to the second reset line RESET2 corresponding to the $(i-M)^{th}$ pixel group; an output terminal of the $j^{th}$ first shift register unit GOA1 is connected to the first reset line RESET1 corresponding to the $j^{th}$ pixel group through the signal transmission line 60; N is an integer greater than 2, M is a preset positive integer, $M+1 \leq i \leq N+M$, $2 \leq M$, $1 \leq j \leq N$, and i and j are integers. The output terminal of the first shift register unit GOA1 is connected to a first reset line RESET1 (or a second reset line RESET2) corresponding to a certain pixel group, which means that the output terminal of the first shift register unit GOA1 is connected to a first reset line RESET1 (or a second reset line RESET2) corresponding to a row of pixel regions in the pixel group.

Each pixel group may include one row of pixel regions to realize the "one driving one" structure. Alternatively, each pixel group may include two rows of pixel regions to realize the "one driving two" structure. Alternatively, each pixel region may include other numbers of rows of pixel regions. In the following embodiments, as an example, each pixel group includes one row of pixel regions for description.

Figure 6:
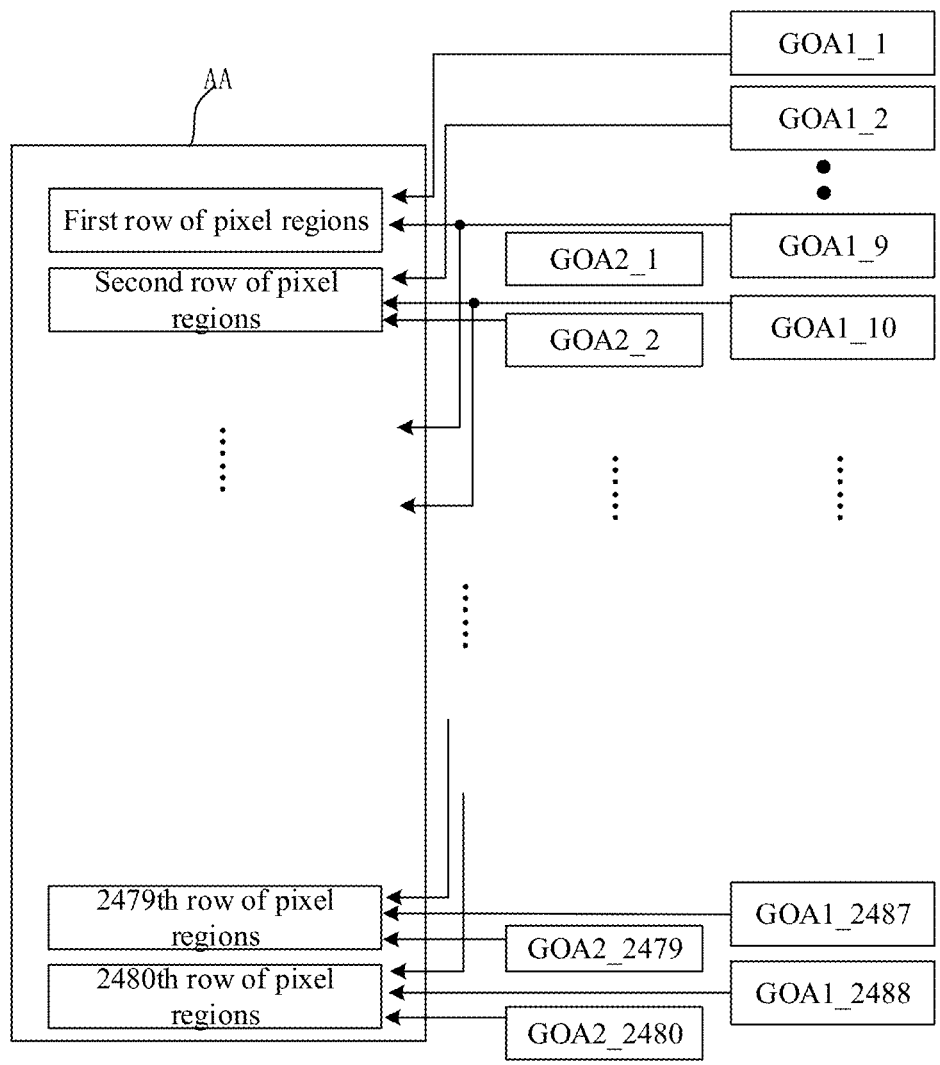
FIG. 6 is a schematic diagram illustrating a correspondence among first shift register units, second shift register units and N rows of pixel regions according to some embodiments of the present disclosure.

FIG. 6 is a schematic diagram illustrating a correspondence among first shift register units, second shift register units and N rows of pixel regions according to some embodiments of the present disclosure. It should be noted that arrows in FIG. 6 only represent a signal flow, rather than an actual arrangement for the signal lines. In FIG. 6, as an example, each pixel group includes one row of pixel regions, M=8, and N=2480. The number of the first shift register units GOA1 is 2488. As shown in FIGS. 5 and 6, the 1st first shift register unit GOA1_1 is connected to the first reset line RESET1 corresponding to the first row of pixel regions through the signal transmission line 60; the 2nd first shift register unit GOA1_2 is connected to the first reset line RESET1 corresponding to the second row of pixel regions through the signal transmission line 60; in a similar fashion, the eighth first shift register unit GOA1 is connected to the first reset line RESET1 corresponding to the eighth row of pixel regions through the signal transmission line 60. The ninth first shift register unit GOA1_9 is connected to the second reset line RESET2 corresponding to the first row of pixel regions, and is connected to the first reset line RESET1 corresponding to the ninth row of pixel regions through the signal transmission line 60; the tenth first shift register unit GOA1_10 is connected to the second reset line RESET2 corresponding to the second row of pixel regions, and is connected to the first reset line RESET1 corresponding to the tenth row of pixel regions through the signal transmission line 60; in a similar fashion, the $2480^{th}$ first shift register unit GOA1 is connected to the second reset line RESET2 corresponding to the $2472^{th}$ row of pixel regions, and is connected to the first reset line RESET1 corresponding to the $2480^{th}$ row of pixel regions through the signal transmission line 60; the $2481^{th}$ to $2488^{th}$ first shift register units GOA1 are connected to the second reset lines RESET2 corresponding to $2473^{th}$ to $2480^{th}$ rows of pixel regions, respectively.

In the embodiments of the present disclosure, an orthographic projection of the signal transmission lines 60 on the base substrate 100 overlaps with an orthographic projection of at least one first shift register unit GOA1 on the base substrate 100. In this case, the signal transmission line 60 does not occupy a space between the first shift register units GOA1 and the display region, so that a frame width of the display substrate can be reduced, which is advantageous to realize a narrow frame.

The signal transmission lines 60 may be located on a side of the first shift register units GOA1 away from the base substrate 100, or may be located between the first shift register units GOA1 and the base substrate 100. In the following embodiments, as an example, the signal transmission lines 60 are located on the side of the first shift register units GOA1 away from the base substrate.

Figure 7:
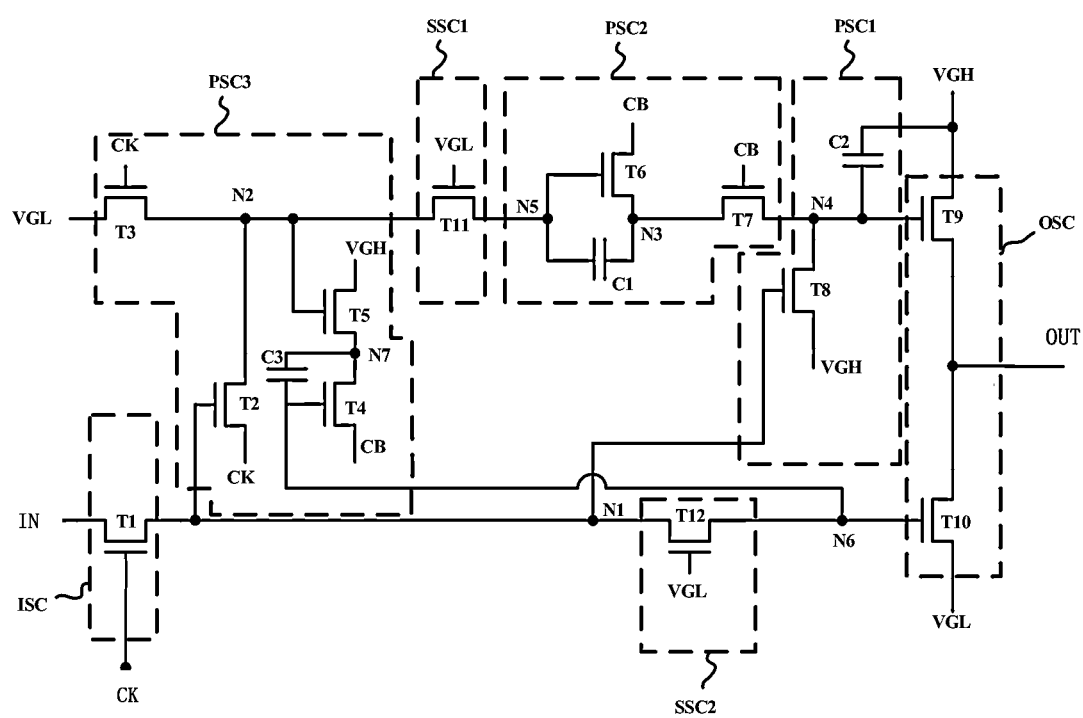
FIG. 7 is a circuit schematic diagram of a first shift register unit according to some embodiments of the present disclosure.

FIG. 7 is a circuit schematic diagram of a first shift register unit according to some embodiments of the present disclosure. As shown in FIG. 7, each first shift register unit GOA1 includes: an input sub-circuit ISC, an output sub-circuit OSC, a first processing sub-circuit PSC1, a second processing sub-circuit PSC2, a third processing sub-circuit PSC3, a first regulator sub-circuit SSC1, and a second regulator sub-circuit SSC2.

In some embodiments, the output sub-circuit OSC is configured to provide a voltage from a third power line VGH or a fourth power line VGL to an output terminal OUT in response to voltages at a fourth node N4 and a first node N1. In some embodiments, the output sub-circuit OSC includes two output transistors, that is, a ninth transistor T9 and a tenth transistor T10, respectively. The ninth transistor T9 is connected between the third power line VGH and the output terminal OUT. A gate electrode of the ninth transistor T9 is connected to the fourth node N4. The ninth transistor T9 may be turned on or off according to the voltage at the fourth node N4. When the ninth transistor T9 is turned on, the voltage from the third power line VGH is provided to the output terminal OUT. The tenth transistor T10 is connected between the output terminal OUT and the fourth power line VGL. A gate electrode of the tenth transistor T10 is connected to the first node N1. The tenth transistor T10 may be turned on or off according to the voltage at the first node N1. When the tenth transistor T10 is turned on, the voltage from the fourth power line VGL is provided to the output terminal OUT.

In some embodiments, the input sub-circuit ISC is configured to control the voltage at the first node N1 in response to signals respectively provided to a first input terminal IN and a first clock signal terminal CK. In some embodiments, the input sub-circuit ISC includes a first transistor T1. A gate electrode of the first transistor T1 is connected to the first clock signal terminal CK, a first electrode of the first transistor T1 is used as the first input terminal IN, and a second electrode of the first transistor T1 is connected to the first node N1.

In some embodiments, the first processing sub-circuit PSC1 is configured to control the voltage at the fourth node N4 in response to the voltage at the first node N1. In some embodiments, the first processing sub-circuit PSC1 includes an eighth transistor T8 and a second capacitor C2. The eighth transistor T8 is connected between the third power line VGH and the fourth node N4. A gate electrode of the eighth transistor T8 is connected to the first node N1. The second capacitor C2 is connected between the third power line VGH and the fourth node N4. In some embodiments, the second capacitor C2 is configured to charge the voltage applied to the fourth node N4. In some embodiments. the second capacitor C2 is configured to stably maintain the voltage at the fourth node N4.

In some embodiments, the second processing sub-circuit PSC2 is connected to a fifth node N5 and is configured to control the voltage at the fourth node N4 in response to a signal input to a third input terminal TM3. In some embodiments, the second processing sub-circuit PSC2 includes a sixth transistor T6, a seventh transistor T7 and a first capacitor C1. A first terminal of the first capacitor C1 is connected to the fifth node N5, a second terminal of the first capacitor C1 is connected to a third node N3, which is a common node between the sixth transistor T6 and the seventh transistor T7. The sixth transistor T6 is connected between the third node N3 and the fifth node N5. A gate electrode of the sixth transistor T6 is connected to the fifth node N5. The seventh transistor T7 is connected between the fourth node N4 and the third node N3. A gate electrode of the seventh transistor T7 is connected to a second clock signal terminal CB.

In some embodiments, the third processing sub-circuit PSC3 is configured to control a voltage at the second node N2. In some embodiments, the third processing sub-circuit PSC3 includes a second transistor T2, a third transistor T3, a fourth transistor T4, a fifth transistor T5 and a third capacitor C3. The fifth transistor T5 is connected between the third power line VGH and the fourth transistor T4. A gate electrode of the fifth transistor T5 is connected to the second node N2. The fourth transistor T4 is connected between the fifth transistor T5 and the second clock signal terminal CB. A gate electrode of the fourth transistor T4 is connected to the gate electrode of the tenth transistor T10. A second electrode of the fourth transistor T4 is connected to a second electrode of the fifth transistor T5. The second transistor T2 is connected between the second node N2 and the first clock signal terminal CK, and a gate electrode of the second transistor T2 is connected to the first node N1. The third transistor T3 is connected between the second node N2 and the fourth power line VGL, and a gate electrode of the third transistor T3 is connected to the first clock signal terminal CK. The third capacitor C3 is connected between the tenth transistor T10 and the fifth transistor T5. A second plate of the third capacitor C3 is connected to the second electrode of the fifth transistor T5 and a first electrode of the fourth transistor T4. A first plate of the third capacitor C3 is connected to the gate electrode of the fourth transistor T4 and the gate electrode of the tenth transistor T10.

In some embodiments, in some embodiments, the third processing sub-circuit PSC3 is configured to control the voltage at the second node N2. The second electrode of the fourth transistor T4 is connected to the second electrode of the fifth transistor T5, the first electrode of the fourth transistor T4 is connected to the second clock signal terminal CB, and the gate electrode of the fourth transistor T4 is connected to the first node N1.

In some embodiments, the first regulator sub-circuit SSC1 includes an eleventh transistor T11. The eleventh transistor T11 is connected between the second node N2 and the fifth node N5, and a gate electrode of the eleventh transistor T11 is connected to the fourth power line VGL. The voltage provided by the fourth power line VGL is an operating level voltage of the eleventh transistor T11, so the eleventh transistor T11 may be kept turned on at all times. Accordingly, the second node N2 and the fifth node N5 may be maintained at the same voltage and operate substantially as the same node.

In some embodiments, the second regulator sub-circuit SSC2 is connected between the first node N1 and the output sub-circuit OSC. The second regulator sub-circuit SSC2 is configured to limit a voltage drop width of the first node N1. In some embodiments, the second regulator sub-circuit SSC2 includes a twelfth transistor T12. The twelfth transistor T12 is connected between the first node N1 and the gate electrode of the tenth transistor T10. A gate electrode of the twelfth transistor T12 is connected to the fourth power line VGL, and the twelfth transistor T12 may be kept turned on at all times. Accordingly, the first node N1 and the gate electrode of the tenth transistor T10 may be maintained at the same voltage.

In some embodiments, each of the first to twelfth transistors T1 to T12 may be formed of a p-type transistor. In some embodiments, an operating level voltage of each of the first to twelfth transistors T1 to T12 may be set to a low level voltage, and a non-operating level voltage of each of the first to twelfth transistors T1 to T12 may be set to a high level voltage.

Figure 8A:
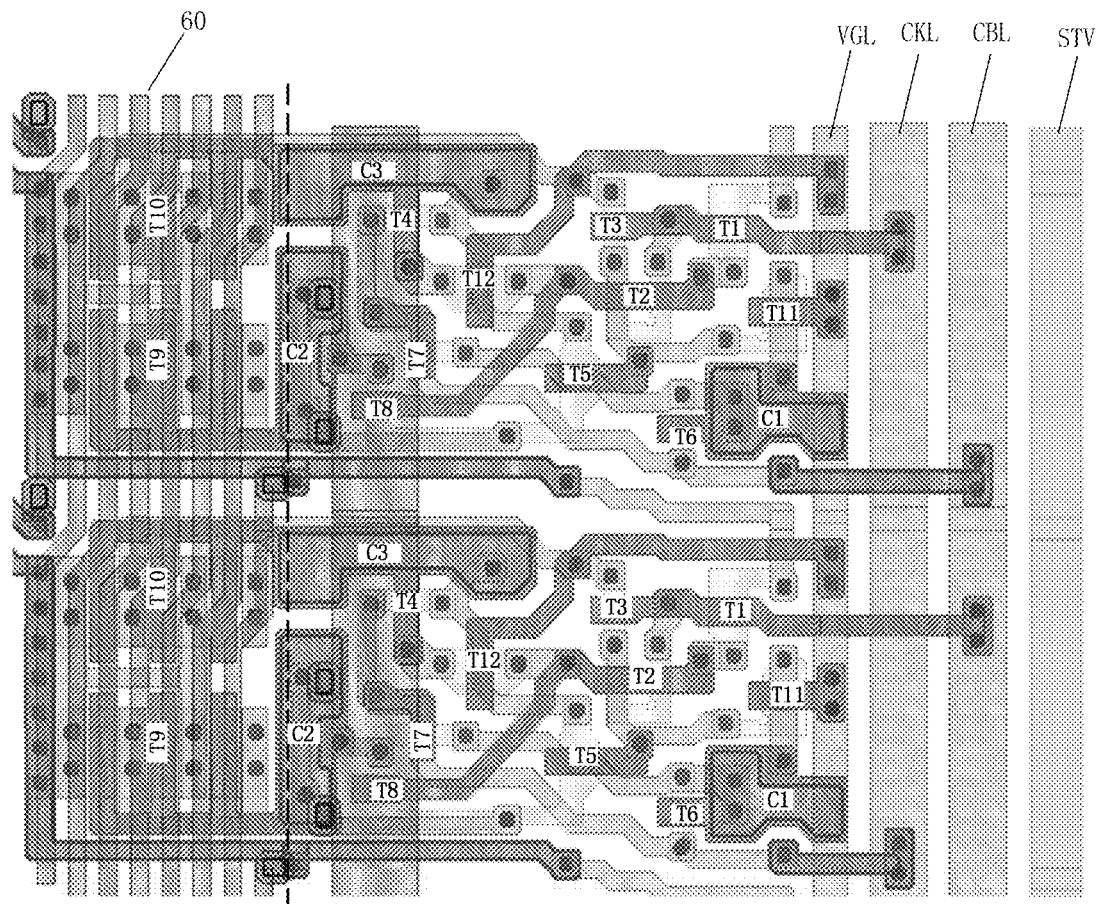
FIG. 8A is a schematic diagram of a part of a display substrate according to some embodiments of the present disclosure.
Figure 9:
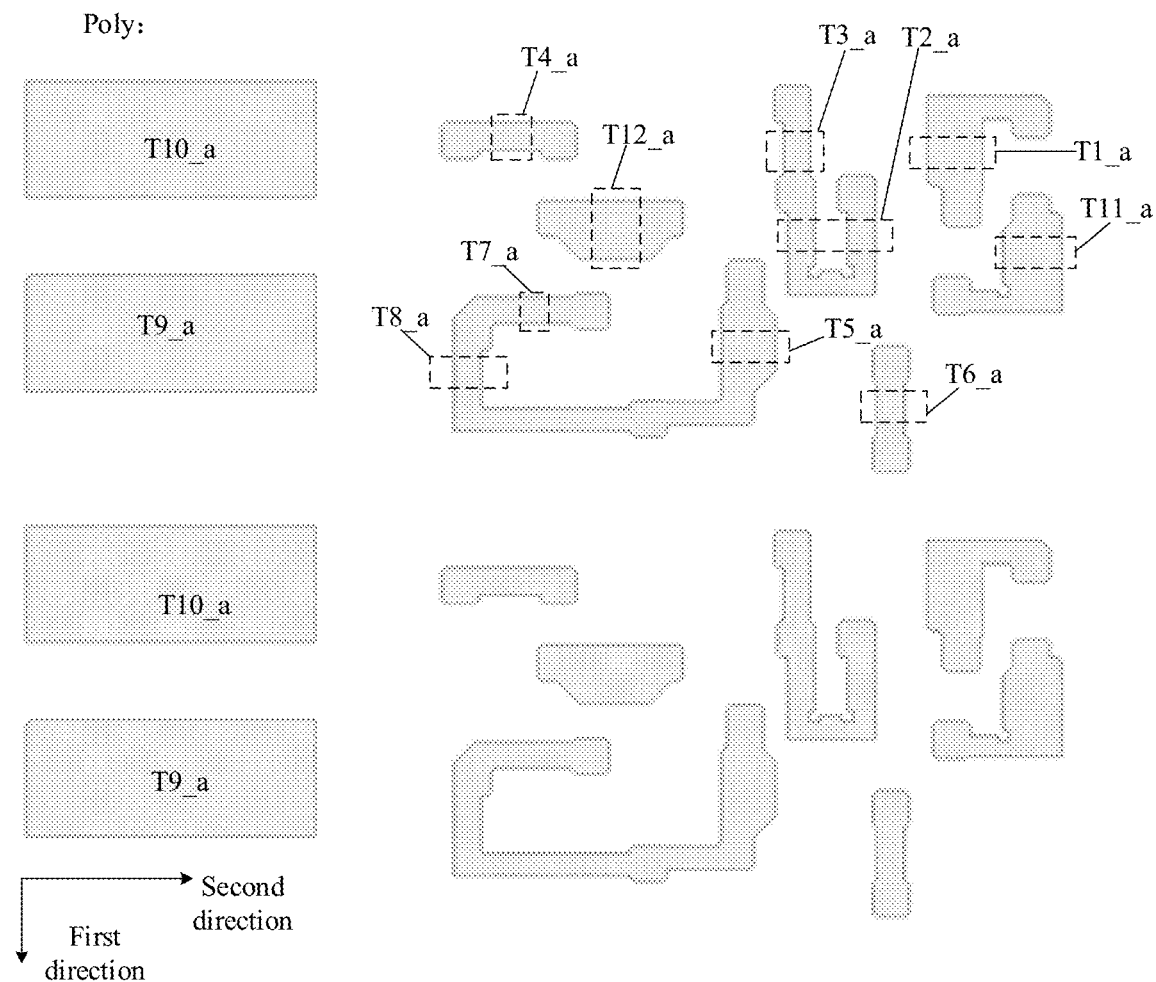
FIG. 9 is a schematic diagram of a semiconductor layer in FIG. 8A.
Figure 10:
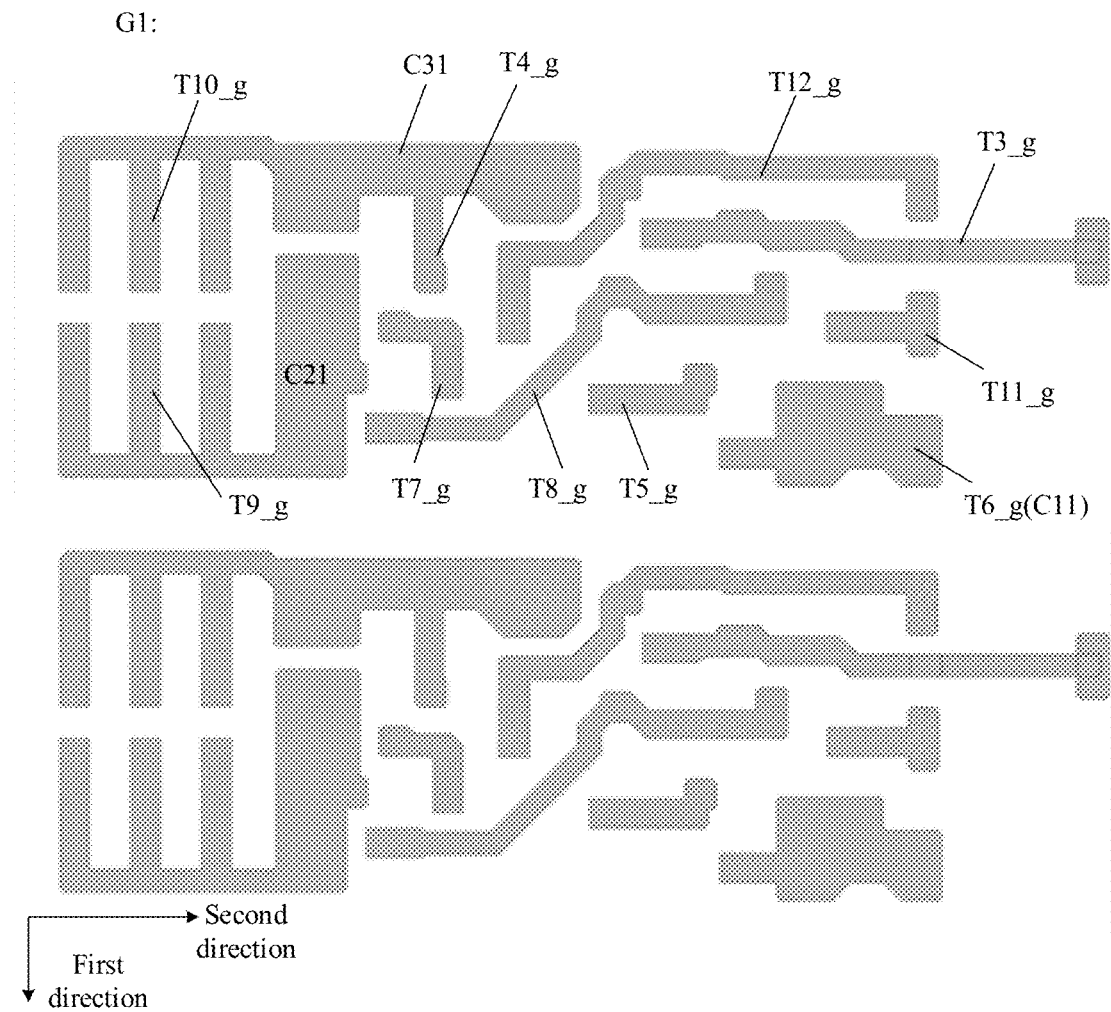
FIG. 10 is a schematic diagram of a first gate metal layer in FIG. 8A.
Figure 11:
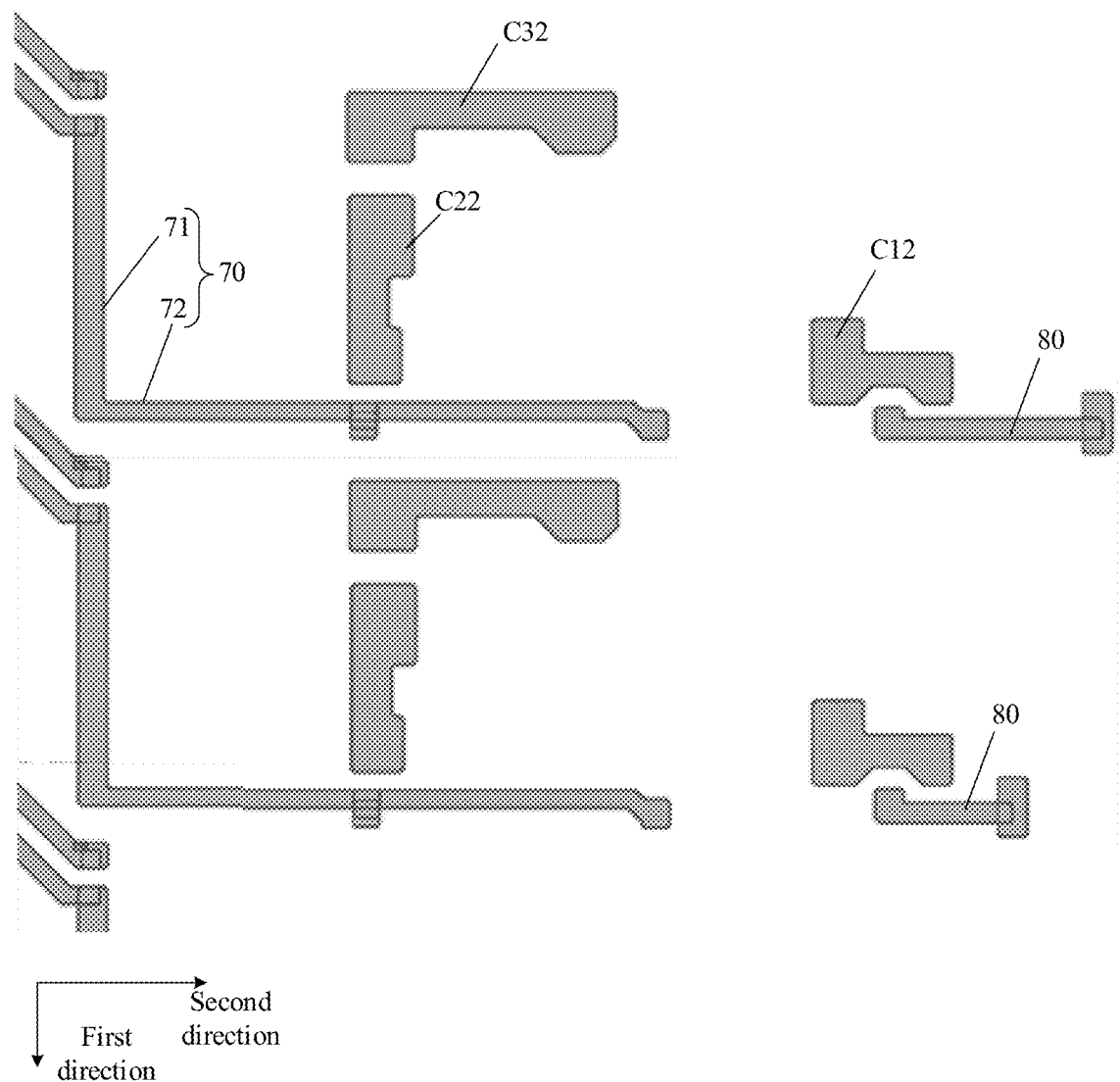
FIG. 11 is a schematic diagram of a second gate metal layer in FIG. 8A.
Figure 12:
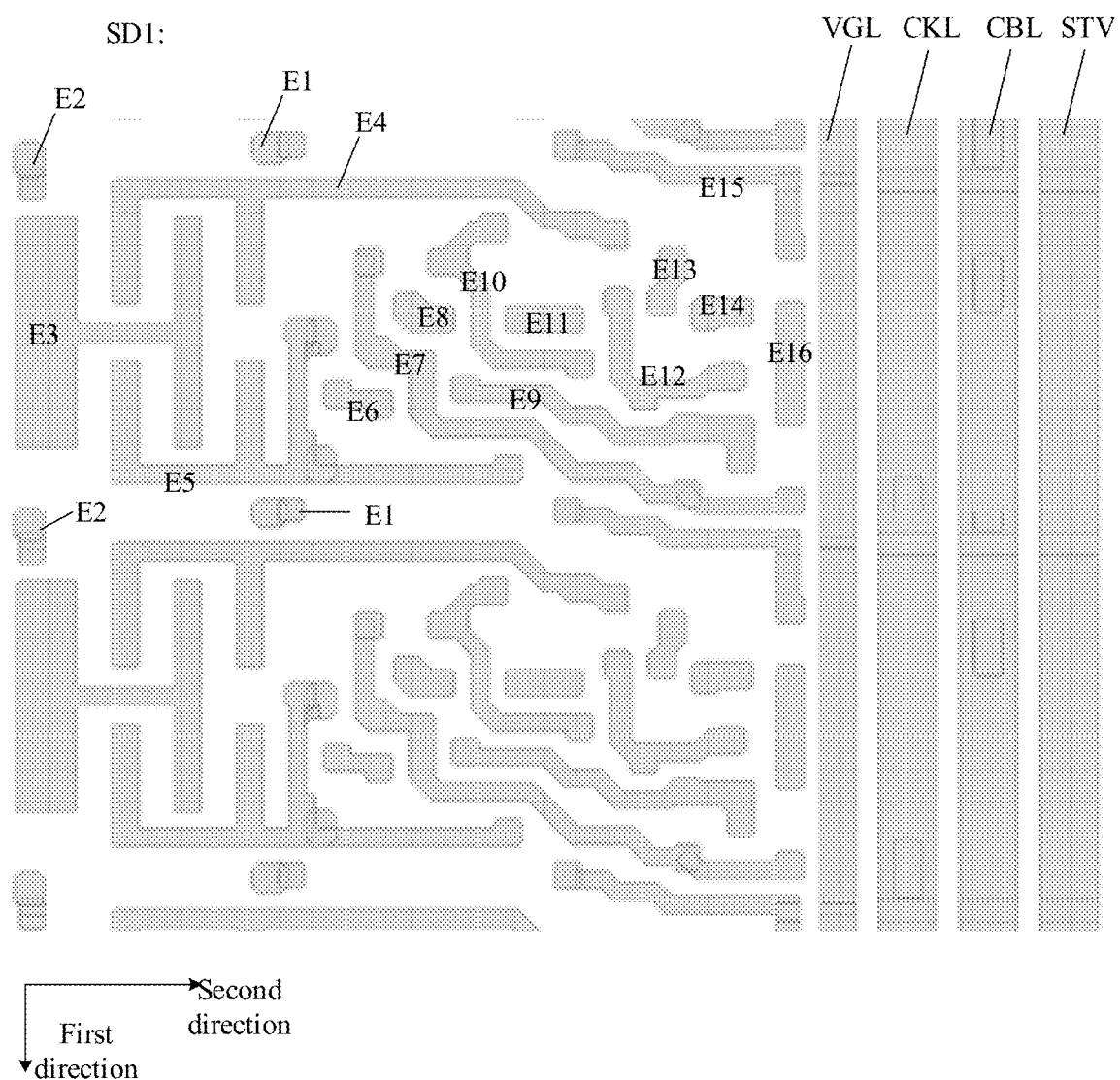
FIG. 12 is a schematic diagram of a first source-drain metal layer in FIG. 8A.
Figure 13:
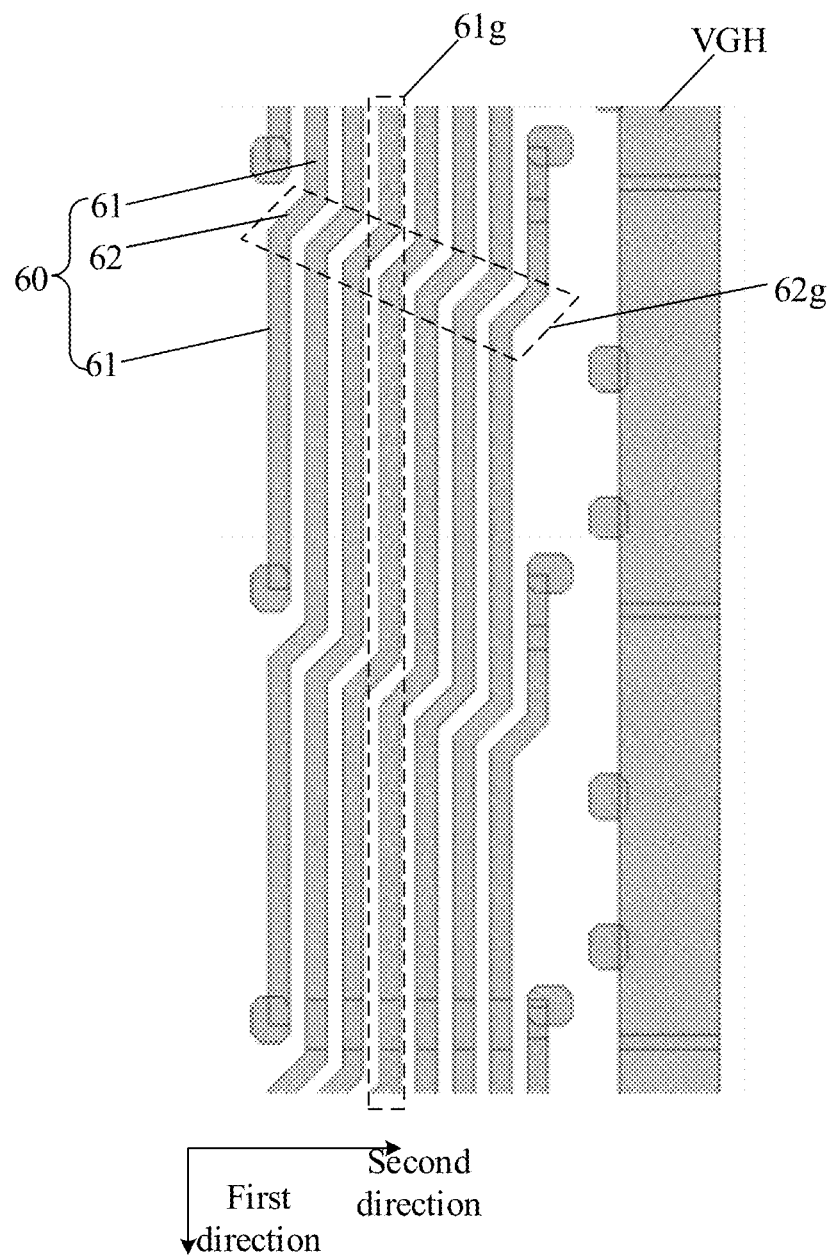
FIG. 13 is a schematic diagram of a second source-drain metal layer in FIG. 8A.
Figure 14:
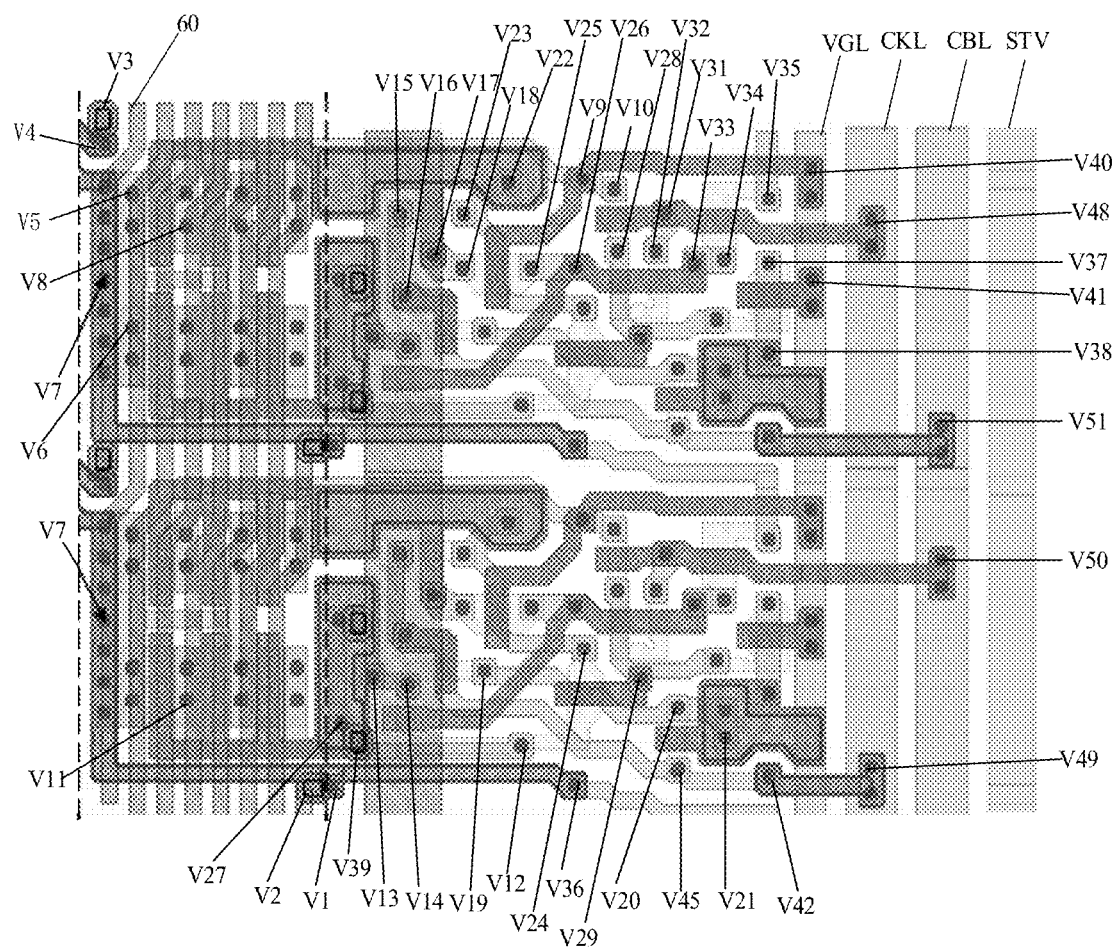
FIG. 14 is a schematic diagram of a distribution of vias in FIG. 8A.

FIG. 8A is a schematic diagram of a part of a display substrate according to some embodiments of the present disclosure. FIG. 8A illustrates two first shift register units GOA1 and a plurality of signal transmission lines 60 and a plurality of driving signal lines in a region where the two first shift register units GOA1 are located, where the plurality of driving signal lines are configured to provide driving signals for the first shift register units GOA1, and for example, the plurality of driving signal lines includes: the third power line, the fourth power line, the first clock signal line, the second clock signal line, and a frame start signal line. At least one driving signal line may be disposed in the same layer as the signal transmission lines 60. In FIGS. 8A to 14, as an example, the third power line is disposed in the same layer as the signal transmission lines 60. FIG. 9 is a schematic diagram of a semiconductor layer in FIG. 8A. FIG. 10 is a schematic diagram of a first gate metal layer in FIG. 8A. FIG. 11 is a schematic diagram of a second gate metal layer in FIG. 8A. FIG. 12 is a schematic diagram of a first source-drain metal layer in FIG. 8A. FIG. 13 is a schematic diagram of a second source-drain metal layer in FIG. 8A. FIG. 14 is a schematic diagram of a distribution for vias in FIG. 8A.

As shown in FIGS. 8A to 14, a semiconductor layer Poly includes: active layers T1_a to T12_a and doped region patterns of the transistors T1 to T12; the active layers and the doped region patterns of the transistors in the same first pixel circuit have a one-piece structure. For the same transistor, the doped region patterns are provided on two sides of the active layer of the transistor, and may be respectively used as a first electrode and a second electrode of the transistor. In some embodiments, the active layer T9_a of the ninth transistor T9 and the active layer T10_a of the tenth transistor T10 are arranged in the first direction. The semiconductor layer Poly may be patterned with a semiconductor material, which may be an oxide semiconductor material, such as IGZO (indium gallium zinc oxide).

A first gate metal layer G1 is disposed on a side of the semiconductor layer away from the base substrate 100, and may be made of, for example, a metal, a metal alloy, a metal nitride, a conductive metal oxide, a transparent conductive material, or the like. For example, the first gate metal layer may be made of gold (Au), an alloy of gold, silver (Ag), an alloy of silver, aluminum (Al), an alloy of aluminum, aluminum nitride (AlNx), tungsten (W), tungsten nitride (WNx), copper (Cu), an alloy of copper, nickel (Ni), chromium (Cr), chromium nitride (CrNx), molybdenum (Mo), an alloy of molybdenum, titanium (Ti), titanium nitride (TiNx), platinum (Pt), tantalum (Ta), tantalum nitride (TaNx), neodymium (Nd), scandium (Sc), Strontium Ruthenium Oxide (SRO), zinc oxide (ZnOx), tin oxide (SnOx), indium oxide (InOx), gallium oxide (GaOx), Indium tin Oxide (ITO), Indium Zinc Oxide (IZO), or the like. The first gate metal layer G1 may have one or more layers.

As shown in FIG. 10, the first gate metal layer G1 includes: the gate electrodes T1_g to T12_g of the transistors T1 to T12, a first plate of the first capacitor C1, a first plate of the second capacitor C2 and the first plate of the third capacitor C3. The gate electrode of the third transistor T3 and the first plate C31 of the third capacitor C3 may have a one-piece structure. The gate electrode T1_g of the first transistor T1 and the gate electrode T3_g of the third transistor T3 may have a one-piece structure. The gate electrode T2_g of the second transistor T2 and the gate electrode T8_g of the eighth transistor T8 may have a one-piece structure. The gate electrode T6_g of the sixth transistor T6 and the first plate C11 of the first capacitor C1 have a one-piece structure.

A second gate metal layer G2 is disposed on a side of the first gate metal layer away from the base substrate 100, and a material of the second gate metal layer G2 may be selected from the materials of the first gate metal layer listed above. In some embodiments, as shown in FIG. 11, the second gate metal layer G2 includes: connecting lines 70, a second plate C12 of the first capacitor C1, a second plate C22 of the second capacitor C2, and the second plate C32 of the third capacitor C3. Each connecting line 70 corresponds to one first shift register unit GOA1, which is connected to the corresponding second reset line RESET2 through the corresponding connecting line 70.

In some embodiments, except for the first shift register unit GOA1 in the last stage, each of the first shift register units GOA1 is connected to an input terminal of the first shift register unit GOA1 in the next stage through a corresponding connecting line 70. The input terminal of each first shift register unit GOA1 may be the first electrode of the first transistor T1, and one end of the connecting line is connected to the first electrode of the first transistor T1 through a via. For example, the connecting line 70 includes a first portion 71 extending in the first direction and a second portion 72 extending in the second direction, one end of the second portion 72 is connected to the first electrode of the first transistor T1 through a via, the other end of the second portion 72 is connected to one end of the first portion 71, and the other end of the first portion 71 is connected to a corresponding second reset line RESET2. The first portion 71 and the second reset line RESET2 may be disposed in the same layer and electrically connected to each other. It should be noted that "electrically connected" in the embodiments of the present disclosure may be directly or indirectly connected.

In some embodiments, the second gate metal layer G2 further includes a clock signal adapter line 80 of the first shift register unit GOA1 in each stage.

As shown in FIG. 12, a first source-drain metal layer SD1 is located on a side of the second gate metal layer G2 away from the base substrate 100, and includes: a plurality of adapters, and the fourth power line VGL, the first clock signal line CKL, the second clock signal line CBL, the frame start signal line STV. The fourth power line VGL, the first clock signal line CKL, the second clock signal line CBL, and the frame start signal line STV all extend along the first direction. The plurality of adapters include: a first adaptor E1 to a sixteenth adaptor E16.

The number of the first adapters E1 is multiple, and each first adapter E1 corresponds to one first shift register unit GOA1. As shown in FIGS. 8A, 12 and 14, one end of each first adapter E1 is connected to the connecting line 70 through a first via V1, and the other end is connected to the signal transmission line 60 through a second via V2. In some examples, the plurality of first adapters E1 are aligned in the first direction.

The number of the second adapters E2 is multiple, each second adapter E2 corresponds to one first shift register unit GOA1, one end of each second adapter E2 is connected to the signal transmission line 60 through a third via V3, and the other end is connected to the first reset line RESET1 through a fourth via V4. In some embodiments, the plurality of second adaptors E2 may be arranged in the first direction.

In some embodiments, orthographic projections of the first via V1, the second via V2, the third via V3 and the fourth via V4 on the base substrate 100 do not overlap with the orthographic projection of each transistor on the base substrate 100, so as to prevent the transistors from being affected during forming the vias.

As shown in FIGS. 8A, 12 and 14, the third adapter E3 is connected to the second electrode of the tenth transistor T10 through a fifth via V5, and is connected to the second electrode of the ninth transistor T9 through a sixth via V6; in addition, the third adapter E3 is further connected to the second portion 72 of the connecting line 70 through a seventh via V7; and a connection node of the second electrode of the ninth transistor T9, the second electrode of the tenth transistor T10, the third adapter E3 and the connecting line 70 may serve as the output terminal of the first shift register unit GOA1.

The fourth adapter E4 is connected to the first electrode of the tenth transistor T10 through an eighth via V8, to the gate electrode of the twelfth transistor T12 through a ninth via V9, and to the first electrode of the third transistor T3 through a tenth via V10. The gate electrode of the twelfth transistor T12 is connected to the fourth power line VGL.

The fifth adapter E5 is connected to the first electrode of the ninth transistor T9 through an eleventh via V11, to the second plate C22 of the second capacitor C2 through a twenty-seventh via V27, and to the first electrode of the fifth transistor T5 through a twelfth via V12.

The sixth adapter E6 is connected to the first plate C21 of the second capacitor C2 through a thirteenth via V13, and to the first electrode of the eighth transistor T8 through a fourteenth via V14. The seventh adapter E7 is connected to the second electrode of the fourth transistor T4 through a fifteenth via V15, to the gate electrode of the seventh transistor T7 through a sixteenth via V16, to the first electrode of the sixth transistor T6 through a forty-fifth via V45, and to the clock signal adapter line 80 through a forty-second via V42.

The eighth adapter E8 is connected to the gate electrode of the fourth transistor T4 through a seventeenth via V17, and to the second electrode of the twelfth transistor T12 through an eighteenth via V18.

The ninth adapter E9 is connected to the first electrode of the seventh transistor T7 through a nineteenth via V19, to the second electrode of the sixth transistor T6 through a twentieth via V20, and to the second plate C12 of the first capacitor C1 through a twenty-first via V21. The number of the twenty-first vias V21 may be one or more (such as two), to improve the connection stability.

The tenth adapter E10 is connected to the second plate C32 of the third capacitor C3 through a twenty-second via V22, to the second electrode of the fourth transistor T4 through a twenty-third via V23, and to the second electrode of the fifth transistor T5 through a twenty-fourth via V24.

The eleventh adapter E11 is connected to the first electrode of the twelfth transistor T12 through a twenty-fifth via V25, and to the gate electrode of the eighth transistor T8 through a twenty-sixth via V26.

The twelfth adapter E12 is connected to the second electrode of the third transistor T3 through a twenty-eighth via V28, to the gate electrode of the fifth transistor T5 through a twenty-ninth via V29, and to the first electrode of the eleventh transistor T11 through a thirtieth via V30.

The thirteenth adapter E13 is connected to the gate electrode of the third transistor T3 through a thirty-first via V31, and to the second electrode of the second transistor T2 through a thirty-second via V32.

The fourteenth adapter E14 is connected to the gate electrode of the second transistor T2 through a thirty-third via V33, and to the second electrode of the first transistor T1 through a thirty-fourth via V34.

Each fifteenth adaptor E15 is connected to the first electrode of the first transistor T1 through a thirty-fifth via V35. In addition, the first shift register unit GOA1 in each stage corresponds to one fifteenth adaptor E15, and the fifteenth adaptor E15 corresponding to the first shift register unit GOA1 in the first stage may be connected to the frame start signal line STV; in addition to the first stage, the fifteenth adaptor E15 corresponding to the first shift register unit GOA1 in each stage is connected to the connecting line 70 corresponding to the first shift register unit GOA1 in the previous stage through a thirty-sixth via V36.

The sixteenth adapter E16 is connected to the second electrode of the eleventh transistor T11 through a thirty-seventh via V37, and to the gate electrode of the sixth transistor T6 through a thirty-eighth via V38.

The first clock signal line CKL is connected to the gate electrodes of the third transistors T3 in the first shift register units GOA1 in odd-numbered stages through vias V48, and to the clock signal adapter lines 80 in the first shift register units GOA1 in even-numbered stages through vias V49. The second clock signal line CBL is connected to the gate electrodes of the third transistors T3 in the first shift register units GOA1 in the even-numbered stages through vias V50, and to the clock signal adapter lines 80 in the first shift register units GOA1 in the odd-numbered stages through vias V51. The clock signal adapter line 80 of the first shift register unit GOA1 in each stage is connected to the seventh adapter E7. The number of the vias V48 to V50 may be one or more (such as two), thereby improving the connection stability.

The fourth power line VGL is connected to the gate electrode of the twelfth transistor T12 through a fortieth via V40, and to the gate electrode of the eleventh transistor T11 through a forty-first via V41. The number of the fortieth vias V40 and the forty-first vias V41 may be one or more (such as two), thereby improving the connection stability.

In some examples, the first clock signal line CKL is located on a side of the fourth power line VGL away from the display region, the second clock signal line CBL is located on a side of the first clock signal line CKL away from the display region, and the frame start signal line STV is located on a side of the second clock signal line CBL away from the display region.

In one example, orthographic projections of the first clock signal line CLK, the second clock signal line CBL, the frame start signal line STV and the fourth power line VGL on the base substrate 100 do not overlap with orthographic projections of the active layers of the transistors in the first shift register unit GOA1 on the base substrate 100.

In some embodiments, the second source-drain metal layer SD2 includes: the plurality of signal transmission lines 60 and the third power line VGH. The third power line VGH extends in the first direction. For example, an orthographic projection of the third power line VGH on the base substrate 100 may overlap with orthographic projections of the third capacitor C3, the fourth transistor T4, and the eighth transistor T8 on the base substrate 100. The third power line VGH may be connected to the fifth adapter E5 through a thirty-ninth via V39. In order to improve the connection stability. each fifth adapter E5 may be connected to the third power line VGH through a plurality of thirty-ninth vias V39.

Figure 8B:
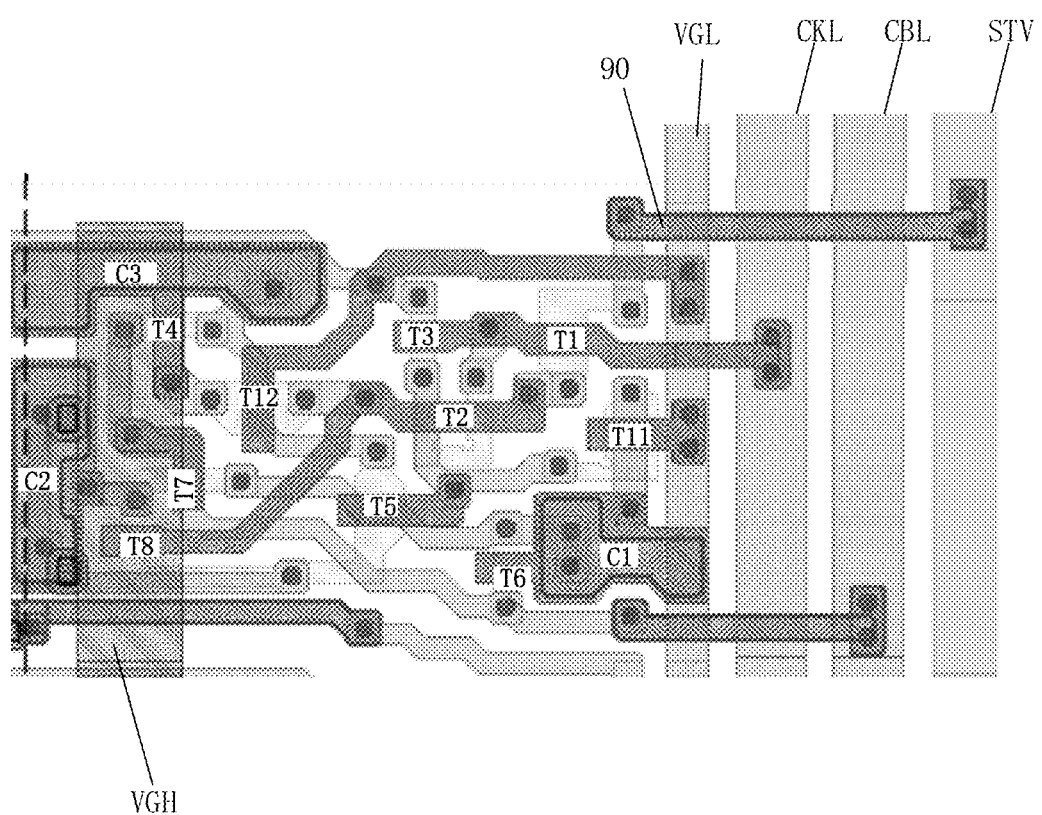
FIG. 8B is a schematic diagram of a part of a region where a first stage shift register unit is located according to some embodiments of the present disclosure.

FIG. 8B is a schematic diagram of a part of a region where a first stage shift register unit is located according to some embodiments of the present disclosure. FIG. 8B illustrates a structure of a part of the first stage shift register unit, and the first clock signal line CKL, the second clock signal line CBL, the frame start signal line STV, the third power line VGH, and the fourth power line VGL. As described above, each stage of the first shift register unit GOA corresponds to one fifteenth adaptor E15 connected to the first electrode of the first transistor T1 through a thirty-fifth via V35, and the fifteenth adaptor E15 corresponding to the shift register unit GOA in the first stage is further connected to one end of a frame start signal adaptor line 90 through a via, and the other end of the frame start signal adaptor line 90 is connected to the frame start signal line STV through a via. The frame start signal adapter line 90 is located in the second gate metal layer G2, but may also be located in the first gate metal layer G1.

As shown in FIG. 8A to FIG. 12, each signal transmission line 60 has a head end and a tail end, and the head end of the signal transmission line 60 is connected to the first adapter E1 through the second via V2, and thus is connected to the output terminal of the first shift register unit GOA1 through the first adapter E1. The tail end of the signal transmission line 60 is connected to the second adapter E2 through the fourth via V4, and thus connected to the second reset line RESET2 through the second adapter E2. An orthographic projection of the signal transmission line 60 on the base substrate 100 overlaps with an orthographic projection of at least one output transistor of the at least one first shift register unit GOA1 on the base substrate 100. For example, in the first shift register unit GOA1 shown in FIG. 7, two output transistors are included, namely, the ninth transistor T9 and the tenth transistor T10. At this time, an orthographic projection of each signal transmission line 60 on the base substrate 100 may overlap with orthographic projections of the ninth transistor T9 and the tenth transistor T10 of at least one first shift register unit GOA1 on the base substrate 100.

In some embodiments, an orthographic projection of each signal transmission line 60 on the base substrate 100 overlaps with an orthographic projection of (M−1) first shift register units GOA1 on the base substrate 100. For example, the orthographic projection of each signal transmission line 60 on the base substrate 100 overlaps with an orthographic projection of the ninth transistors T9 and the tenth transistors T10 of the (M−1) first shift register units GOA1 on the base substrate 100.

As shown in FIG. 8A, the orthographic projection of the signal transmission line 60 on the base substrate 100 does not overlap with an orthographic projection of a storage capacitor (such as the first capacitor C1, the second capacitor C2 or the third capacitor C3) on the base substrate 100, so as to avoid the signal interference between the storage capacitor and the signal transmission line 60 caused by the parasitic capacitance generated between the signal transmission line 60 and the storage capacitor.

As shown in FIG. 13, each signal transmission line 60 has a bent structure, and includes a plurality of transmission line segments 61 extending along the first direction and a connecting line segment 62 located between two adjacent transmission line segments 61. Each signal transmission line 60 has the head end connected to the output terminal of the first shift register unit GOA1 and the tail end connected to the first reset line RESET1. The signal transmission line 60 is located on a side of the third power line VGH close to the display region (in FIG. 13, the display region is located on the left side of the signal transmission line 60). For two adjacent transmission line segments 61 in the same signal transmission line 60, a distance from a transmission line segment 61 close to the head end to the display region is greater than a distance from a transmission line segment 61 far from the head end to the display region. The orthographic projection of the signal transmission line 60 on the base substrate 100 is located between orthographic projections of the display region and the storage capacitor on the base substrate 100. In a direction from the head end to the tail end of the signal transmission line 60, the signal transmission line 60 is bent for multiple times towards the display region, so that a width of a region where the plurality of signal transmission lines 60 are located is favorably reduced.

As shown in FIG. 13, each connecting line segment 62 is a straight line segment, and each connecting line segment 62 and the transmission line segment 61 adjacent to the connecting line segment 62 form an obtuse angle therebetween, which may be between 95° and 160°, for example, 95°, 100°, 120°, 145°, 150°, or 160°. Alternatively, in other embodiments, the connecting line segment 62 may also be an arc line segment, so that the connecting line segment 62 and the transmission line segment 61 adjacent to the connecting line segment 62 form a structure with a rounded corner therebetween.

As shown in FIG. 13, the connecting line segments 62 in the signal transmission lines 60 connected to the plurality of first shift register units GOA1 are divided into a plurality of first line segment groups 62g arranged along the first direction; at least some first line segment groups 62g include (M−1) connecting line segments 62. In some examples, central connecting lines of the (M−1) connecting line segments 62 (lines connecting centers of the (M−1) connecting line segments 62) are on the same straight line, and an extending direction of the central connecting line intersects with both the first direction and the second direction. Alternatively, in other examples, the central connecting lines of the (M−1) connecting line segments 62 may not be on the same straight line.

As shown in FIG. 13, the central connecting lines of the (M−1) connecting line segments 62 are on the same straight line, and the central connecting lines and the connecting line segments 62 are inclined in different directions. For example, as shown in FIG. 13, the central connecting lines of the (M−1) connecting line segments 62 are inclined in a "\" pattern, and the connecting line segments 62 are inclined in a "/" pattern.

As shown in FIG. 13, in the first line segment group 62g including the (M−1) connecting line segments 62, lengths of the connecting line segments 62 are the same, or lengths of at least two connecting line segments 62 are different.

In some embodiments, the connecting line segments 62 in a region corresponding to two adjacent first shift register units are inclined in different patterns. For example: the connecting line segments 62 of the signal transmission line 60 in a region corresponding to the output terminal of the 1$^{st}$ first shift register unit GOA1_1 are inclined in the "\" pattern; the connecting line segments 62 of the signal transmission line 60 in a region corresponding to the output terminal of the 2nd first shift register unit GOA1_2 are inclined in the "/" pattern.

As shown in FIGS. 8A and 13, in the first line segment group 62g, an orthographic projection of at least one connecting line segment 62 on the base substrate 100 overlaps with an orthographic projection of the tenth transistor T10 on the base substrate 100.

As shown in FIG. 13, the transmission line segments 61 in the signal transmission lines 60 connected to the plurality of first shift register units GOA1 are divided into a plurality of second line segment groups 61g arranged along the second direction; each second line segment group 61g includes a plurality of transmission line segments 61 arranged along the first direction, and the transmission line segments 61 in the same second line segment group 61g are located on the same straight line.

As shown in FIG. 13, the transmission line segments 61 in the signal transmission lines 60 connected to the plurality of first shift register units GOA1 are divided into a plurality of second line segment groups 61g arranged along the second direction; each second line segment group 61g includes a plurality of transmission line segments 61 arranged along the first direction, and the transmission line segments 61 in the same second line segment group 61g are located on the same straight line. In this way, the width of the region, where the plurality of signal transmission lines 60 are located, is small as a whole.

In some embodiments, the transmission line segments 61 in each second line segment group 61g are connected to different shift register units.

A distance between every two adjacent second line segment groups 61g is constant.

In one example, the transmission line segments 61 and the connecting line segments 62 may have substantially the same width. The term "substantially the same" in the embodiments of the present disclosure means that a difference between the two values is less than 10%, or 5%, or the two values are completely equal to each other. A distance between two adjacent second line segment groups 61g may be less than 1.5 times the width of the transmission line segment 61. In one example, the width of the transmission line segment 61 and the distance between two adjacent second line segment groups 61g are each less than or equal to 10 μm. For example, the width of the transmission line segment 61 and the distance between two adjacent second line segment groups 61g are each 3 µm, or 5 µm, or 7 µm, or 9 µm, or 10 µm.

In the embodiments shown in FIGS. 8A to 14, orthographic projections of the driving signal lines on the base substrate 100 do not overlap with orthographic projections of the signal transmission lines 60 on the base substrate 100. The orthographic projections of the driving signal lines such as the fourth power line VGL, the first clock signal line CK, and the second clock signal line CB on the base substrate 100 do not overlap with orthographic projections of the active layers of the transistors in the first shift register unit GOA1 on the base substrate 100. In other embodiments, an orthographic projection of at least one driving signal line on the base substrate 100 overlaps with the orthographic projections of the active layers of the transistors in the first shift register unit GOA1 on the base substrate 100. The driving signal lines overlapping with the orthographic projections of the active layers of the transistors in the first shift register unit GOA1 on the base substrate 100 are disposed in the same layer as the signal transmission lines 60, and are all located in the second source-drain metal layer SD2.

Figure 15:
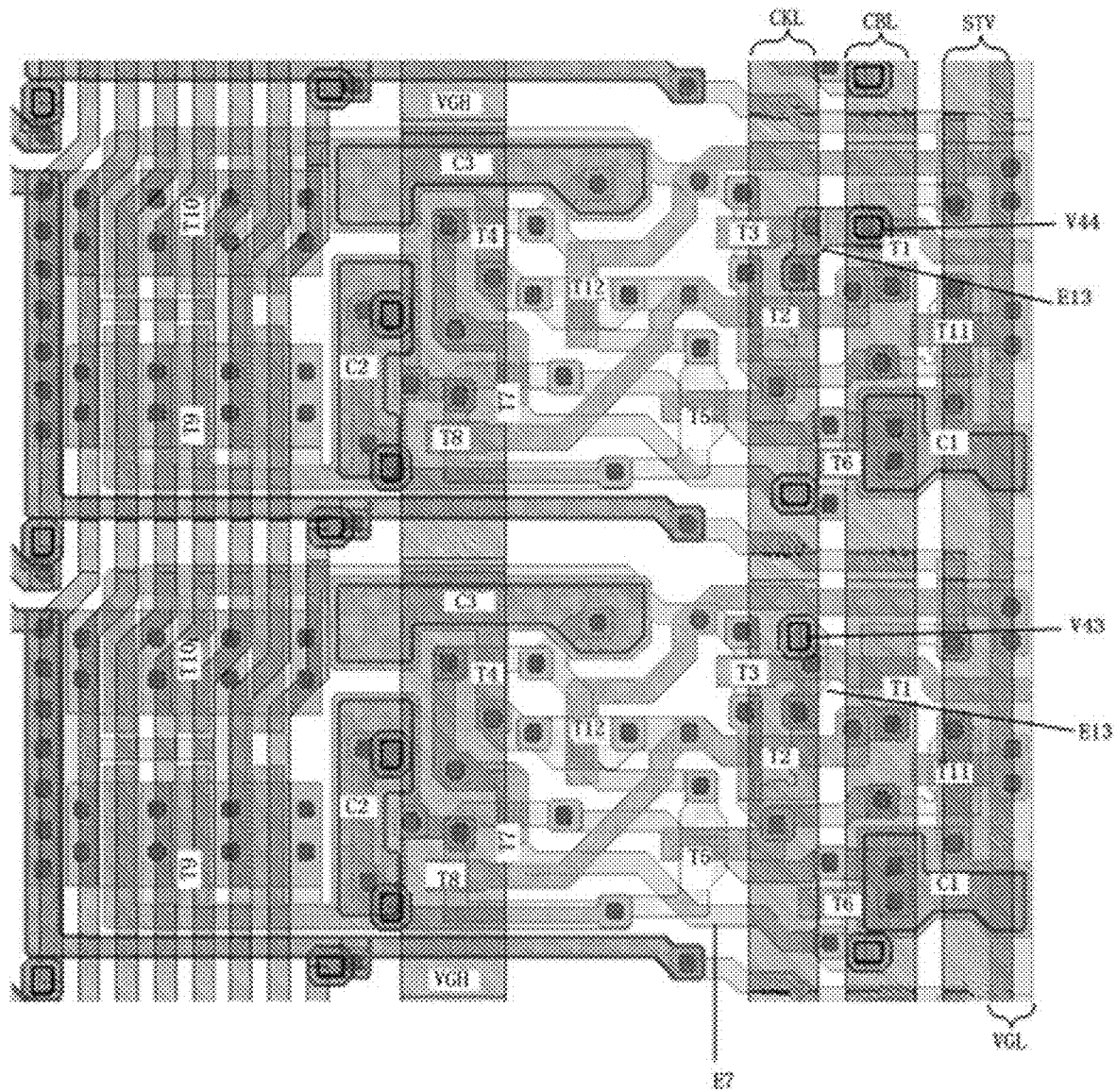
FIG. 15 is a plan view of first shift register units and signal lines according to further embodiments of the present disclosure.

FIG. 15 is a plan view of first shift register units and signal lines according to further embodiments of the present disclosure. As shown in FIG. 15, orthographic projections of the first clock signal line CKL, the second clock signal line CBL and the frame start signal line STV on the base substrate 100 overlap with the orthographic projections of the active layers of the transistors in the first shift register unit GOA1 on the base substrate 100. For example, an orthographic projection of the first clock signal line CKL on the base substrate 100 overlaps with an orthographic projection of the active layer of the second transistor T2 on the base substrate 100 and an orthographic projection of the active layer of the third transistor T3 on the base substrate 100. An orthographic projection of the second clock signal line CBL on the base substrate 100 overlaps with an orthographic projection of the active layer of the first transistor T1 on the base substrate 100.

In the embodiments shown in FIG. 15, the orthographic projections of the driving signal lines on the base substrate 100 do not overlap with the orthographic projections of the signal transmission lines 60 on the base substrate 100 either. The fourth power line VGL is located in the first source-drain metal layer. The first clock signal line CKL, the second clock signal line CBL, the frame start signal line STV, the third power line VGH and the signal transmission line 60 are all disposed in the same layer, and are all located in the second source-drain metal layer. An orthographic projection of the frame start signal line STV on the base substrate may overlap with an orthographic projection of the fourth power line VGL on the base substrate.

As shown in FIG. 15, the first clock signal line CKL is located on a side of the third power line VGH away from the display region, the second clock signal line CBL is located on a side of the first clock signal line CKL away from the display region, and the frame start signal line STV is located on a side of the second clock signal line CBL away from the display region.

It should be noted that in FIG. 15, as an example, the first clock signal line CKL, the second clock signal line CBL, the frame start signal line STV, and the third power line VGH are disposed in the same layer. In other embodiments, the first clock signal line CKL, the second clock signal line CBL, the frame start signal line STV, and the third power line VGH may be disposed in different layers, such as in two or more layers. In addition, the signal transmission lines 60 and any one of the driving signal lines may be provided in different layers. For example, the third power line is disposed in the first source-drain metal layer, the signal transmission lines 60 are disposed in the second source-drain metal layer, and the first clock signal line CKL, the second clock signal line CBL, the frame start signal line STV, and the third power line VGH are disposed on a side of the second source-drain metal layer away from the base substrate 100.

In some embodiments, as shown in FIG. 15, when the first clock signal line CKL, the second clock signal line CBL, the frame start signal line STV and the third power line VGH are disposed in the same layer, the first clock signal line CKL is connected to the thirteenth adapters E13 of the first shift register units GOA1 in the odd-numbered stages through forty-third vias V43, and the second clock signal line is connected to the thirteenth adapters E13 of the first shift register units GOA1 in the even-numbered stages through forty-fourth vias V44. In addition, in the embodiments shown in FIG. 15, a clock signal connection element is not required to be disposed in the second gate metal layer. At this time, the first clock signal line CKL is directly connected to the seventh adapters E7 of the first shift register units GOA1 in the odd-numbered stages through a via, and the second clock signal line CBL is directly connected to the seventh adapters E7 of the first shift register units GOA1 in the even-numbered stages through a via.

In some embodiments, when the frame start signal line STV is located in the second source-drain metal layer, an orthographic projection of the frame start signal line STV may overlap with an orthographic projection of the first electrode of the first transistor T1 of the first shift register unit GOA in the first stage. At this time, the frame start signal line STV may be directly connected to the first electrode of the first transistor T1 in the shift register unit GOA in the first stage through a via, without the frame start signal adapter line 90 in FIG. 8B.

It should be noted that the display substrate further includes a plurality of insulating layers disposed on the base substrate 100, and including, for example: a first gate insulating layer, a second gate insulating layer, an interlayer dielectric layer and a passivation layer. The first gate insulating layer is arranged between the semiconductor layer Poly and the first gate metal layer G1, the second gate insulating layer is arranged between the first gate metal layer and the second gate metal layer, the interlayer dielectric layer is arranged between the second gate metal layer and the first source-drain metal layer, and the passivation layer is arranged between the first source-drain metal layer and the second source-drain metal layer. In the embodiments of the present disclosure, when two conductive structures are connected to each other through a via, the via extends through an insulating layer between the two conductive structures.

In addition, in the embodiments of the present disclosure, the same structures of each transistor in the first shift register unit and each transistor in the pixel circuit may be disposed in the same layer. For example, the gate electrode of each transistor in the first shift register unit and the gate electrode of each transistor in the pixel circuit are disposed in the same layer, and the active layer of each transistor in the first shift register unit and the active layer of each transistor in the pixel circuit are disposed in the same layer. In addition, in some examples, a planarization layer may be provided on a side of the second source-drain metal layer SD2 away from the base substrate 100, and the light emitting devices in the display region are disposed on a side of the planarization layer away from the base substrate.

In some examples, materials of the first gate insulating layer, the second gate insulating layer, the interlayer dielectric layer, and the passivation layer may be selected from: silicon oxynitride (SiON), silicon oxide (SiOx), silicon nitride (SiNx), silicon oxycarbide (SiOxCy), silicon carbonitride (SiCxNy), aluminum oxide (AlOx), aluminum nitride (AlNx), tantalum oxide (TaOx), hafnium oxide (HfOx), zirconium oxide (ZrOx), titanium oxide (TiOx), and the like. The first gate insulating layer, the second gate insulating layer, the interlayer dielectric layer, and the passivation layer may be formed as one or more layers. A material of the planarization layer may include an organic material.

Figure 16:
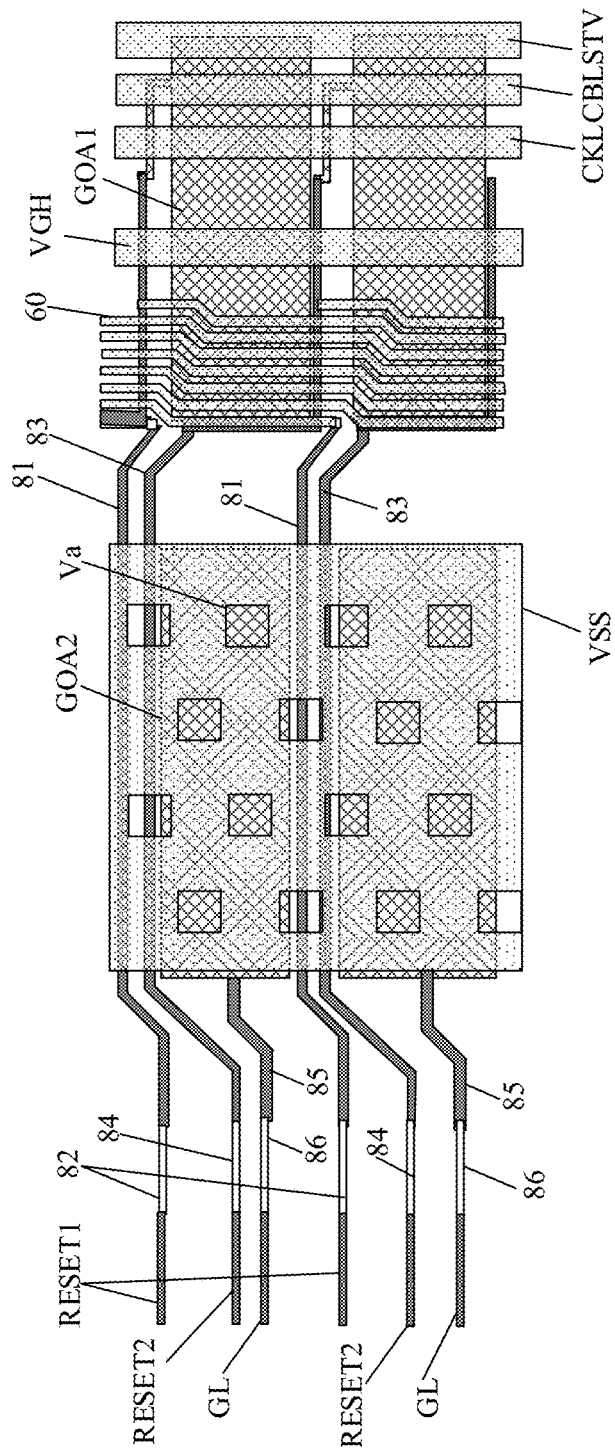
FIG. 16 is a partial schematic diagram of a peripheral region according to further embodiments of the present disclosure.

FIG. 16 is a schematic diagram of a part of a peripheral region according to further embodiments of the present disclosure. With reference to FIGS. 5 and 16, the display substrate further includes: a plurality of scan lines GL disposed and a second driving circuit 40 on the base substrate 100, wherein at least a portion of each scan line GL is located in the display region AA; the second driving circuit 40 is located in the peripheral region NA, and each row of pixel regions corresponds to one scan line GL. The second driving circuit 40 includes a plurality of cascaded second shift register units GOA2, and an output terminal of each second shift register unit GOA2 is connected to one scan line GL for providing scan signals to the scan line GL. The second driving circuit 40 may be located on a side of the first driving circuit 30 close to the display region AA.

The second driving circuit 40 may be disposed on one side of the display region AA, or the second driving circuits 40 may be disposed on two opposite sides of the display region AA. The second shift register unit GOA2 has a structure similar to that of the first shift register unit GOA1, and includes a plurality of transistors and storage capacitors. The first driving circuit 30 is located on a side of the second driving circuit 40 away from the display region AA. Alternatively, in other embodiments, the first driving circuit 30 may also be located on a side of the second driving circuit 40 close to the display region AA.

The display substrate further includes the second power line VSS for providing electrical signals to the second electrodes of the light emitting devices 20 in the display region AA. An orthographic projection of the second power line VSS on the base substrate 100 overlaps with an orthographic projection of the second shift register unit GOA2 on the base substrate 100, so that the frame width on both sides of the display region AA is reduced.

As shown in FIG. 16, the second power line VSS includes a plurality of hollow portions Va to reduce the parasitic capacitance between the second power line VSS and the conductive structure of the second shift register unit GOA2. The conductive structure in the second shift register unit GOA2 may include a first electrode, a second electrode, a gate electrode of each transistor and two plates of each storage capacitor in the second shift register unit GOA2. A shape of each hollow portion Va is not limited, and may be, for example, a rectangle, a circle, a triangle, an ellipse, or the like.

In some embodiments, the second power line VSS may be disposed in the same layer as the signal transmission lines 60, so that the second power line VSS and the signal transmission lines 60 may be formed simultaneously, thereby simplifying the manufacturing process. In addition, the first clock signal line CKL, the second clock signal line CBL, and the frame start signal line STV are all disposed in the same layer as the signal transmission lines 60, thereby further simplifying the manufacturing process.

It should be noted that the second power line VSS may also be located in a different layer from the signal transmission lines 60. For example, the second power line VSS is located on a side of the layer where the signal transmission lines 60 are located away from the base substrate 100.

In some embodiments, the second power line VSS is located on a side of the layer where the signal transmission lines 60 are located away from the base substrate 100, and the second power line VSS overlaps with at least a portion of the signal transmission lines 60. For example: the second power line VSS is formed of the same conductive layer as the first electrode (e.g., the anode) of the light emitting device 20 in the display region AA.

In some embodiments, the display substrate further includes a first signal adapter line 81, a second signal adapter line 82, a third signal adapter line 83, and a fourth signal adapter line 84 disposed in the peripheral region.

The signal transmission line 60 may be connected to a first end of the first signal adaptor line 81, a second end of the first signal adaptor line 81 is connected to a first end of the second signal adaptor line 82, and a second end of the second signal adaptor line 82 is connected to the first reset line RESET1. A connecting line connected to the ninth transistor T9 and the tenth transistor T10 may be connected to a first end of the third signal adapter line 83, a second end of the third signal adapter line 83 is connected to a first end of the fourth signal adapter line 84, and a second end of the fourth signal adapter line 84 is connected to the second reset line RESET2. The output terminal of the second shift register unit is connected to a first end of the fifth signal adapter line 85, a second end of the fifth signal adapter line 85 is connected to a first end of the sixth signal adapter line 86, and a second end of the sixth signal adapter line 86 is connected to the scan line.

The first reset lines RESET1 and the second reset lines RESET2 may be located in the first gate metal layer, the first signal adapter line 81, the third signal adapter line 83, and the fifth signal adapter line 85 may be located in the second gate metal layer, and the second signal adapter line 82, the fourth signal adapter line 84, and the sixth signal adapter line 86 may be located in the first source-drain metal layer.

In addition, in the embodiments of the present disclosure, as shown in FIG. 5, the display substrate further includes the third driving circuit 50 and the plurality of light emitting control lines EM, and the third driving circuit 50 is disposed in the peripheral region NA and includes the plurality of cascaded third shift register units GOA3. At least a part of each light emitting control line EM is disposed in the display region AA, and each third shift register unit GOA3 is connected to one light emitting control line EM.

The embodiments of the present disclosure further provide a method for manufacturing the display substrate, which has a display region and a peripheral region, and the display region includes N rows of pixel regions arranged along a first direction. The method for manufacturing a display substrate includes:

S1, forming a plurality of first reset lines and a plurality of second reset lines on a base substrate, wherein each row of pixel regions corresponds to one first reset line and one second reset line.

S2, forming (N+M) first shift register units on the base substrate at a position corresponding to the peripheral region; wherein the (N+M) first shift register units are arranged along the first direction, and an output terminal of the $i^{th}$ first shift register unit is connected to a second reset line corresponding to the $(i-M)^{th}$ row of pixel regions; an output terminal of the $j^{th}$ first shift register unit is connected to a first reset line corresponding to the $j^{th}$ row of pixel regions through a signal transmission line; N is an integer greater than 2, M is a preset positive integer, M+1≤i≤N+M, 1≤j≤N, and i and j are integers.

An orthographic projection of the signal transmission line on the base substrate overlaps with an orthographic projection of at least one first shift register unit on the base substrate.

The first reset lines and the second reset lines may be located in the first gate metal layer, and may be formed in synchronization with some components in the first shift register unit. For example, the first reset lines and the second reset lines may be formed in synchronization with the gate electrodes of the transistors in the first shift register unit.

In some embodiments, the method further includes: forming a plurality of driving signal lines for providing signals for the plurality of first shift register units, wherein an orthographic projection of at least one of the plurality of driving signal lines on the base substrate overlaps with orthographic projections of the plurality of first shift register units on the base substrate. At least one of the plurality of driving signal lines is formed in synchronization with the signal transmission lines.

For example, the plurality of driving signal lines include: the first clock signal line, the second clock signal line, the frame start signal line, the third power line and the fourth power line. In some embodiments, the third power line, the first clock signal line, the second clock signal line, the frame start signal line and the signal transmission lines are simultaneously formed. In other embodiments, the third power line and the signal transmission lines are simultaneously formed.

The embodiments of the present disclosure further provide a display apparatus, which includes the display substrate in the above embodiments. The display apparatus may be: any product or component with a display function, such as an electronic paper, an OLED panel, a mobile phone, a tablet computer, a television, a display, a notebook computer, a digital photo frame, a navigator or the like.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A display substrate, comprising a display region and a peripheral region, wherein the display region comprises N pixel groups arranged in a first direction; each pixel group comprises at least one row of pixel regions; the display substrate comprises:
   a base substrate;
   a plurality of first reset lines and a plurality of second reset lines on the base substrate; wherein each row of pixel regions corresponds to one first reset line and one second reset line; and
   (N+M) first shift register units on the base substrate and in the peripheral region, wherein the (N+M) first shift register units are arranged along the first direction, an output terminal of an $i^{th}$ first shift register unit is connected to a first reset line corresponding to an $(i-M)^{th}$ row of pixel regions; an output terminal of the $j^{th}$ first shift register unit is connected to a second reset line corresponding to a $j^{th}$ row of pixel regions through a signal transmission line; N is an integer greater than 2, M is a preset positive integer, M+1≤i≤N+M, 1≤j≤N, i and j are both integers, and N is greater than M;
   wherein an orthographic projection of the signal transmission line on the base substrate overlaps with an orthographic projection of at least one of the first shift register units on the base substrate.

2. The display substrate of claim 1, wherein each first shift register unit comprises: an output transistor connected to an output terminal of the first shift register unit, and the orthographic projection of the signal transmission line on the base substrate overlaps with an orthographic projection of the output transistor of the at least one first shift register unit on the base substrate.

3. The display substrate of claim 1, wherein an orthographic projection of each signal transmission line on the base substrate overlaps with an orthographic projection of (M−1) first shift register units on the base substrate.

4. The display substrate of claim 1, wherein each first shift register unit comprises a storage capacitor, and an orthographic projection of the signal transmission line on the base substrate does not overlap with an orthographic projection of the storage capacitor on the base substrate.

5. The display substrate of claim 1, wherein each signal transmission line comprises a plurality of transmission line segments extending in the first direction and a connecting line segment between two adjacent transmission line segments; and
   the signal transmission line comprises a head end and a tail end, the head end is connected to the output terminal of the first shift register unit, and the tail end is connected to the first reset line; for two adjacent transmission line segments in a same signal transmission line, a distance between one transmission line segment of the two adjacent transmission line segments close to the head end and the display region is greater than a distance between the other transmission line segment of the two adjacent transmission line segments far from the head end and the display region.

6. The display substrate of claim 5, wherein the connecting line segment is a straight line segment, and there is an obtuse angle between the connecting line segment and the transmission line segment adjacent to the connecting line segment.

7. The display substrate of claim 5, wherein the connecting line segments of the signal transmission lines connected to the first shift register units are divided into a plurality of first line segment groups arranged along the first direction; at least one first line segment group each comprises (M−1) connecting line segments;
   wherein a central connecting line connecting centers of the (M−1) connecting line segments is a same straight line, and an extending direction of the central connecting line intersects with the first direction and an extending direction of the first reset line; or
   a central connecting line connecting centers of the (M−1) connecting line segments is not a same straight line.

8. The display substrate of claim 7, wherein the central connecting line of the (M−1) connecting line segments is the same straight line, and the central connecting line and the connecting line segments are inclined in different directions.

9. The display substrate of claim 7, wherein the (M−1) connecting line segments have a same length; or
   at least two of the (M−1) connecting line segments have different lengths.

10. The display substrate of claim 5, wherein the transmission line segments of the signal transmission lines connected to the first shift register units are divided into a plurality of second line segment groups arranged along a second direction; each second line segment group comprises a plurality of transmission line segments arranged along the first direction, and the transmission line segments in a same second line segment group are on a same straight line, and the second direction is perpendicular to the first direction.

11. The display substrate of claim 10, wherein the plurality of second line segment groups are arranged at a same interval between every two adjacent second line segment groups.

12. The display substrate of claim 1, wherein the display substrate further comprises:
- a plurality of scan lines, wherein each row of pixel regions corresponds to one scan line;
- a plurality of second shift register units in the peripheral region, wherein an output terminal of each second shift register unit is connected to one scan line; and
- a power line, wherein an orthographic projection of the power line on the base substrate overlaps with an orthographic projection of the plurality of second shift register units on the base substrate;
- wherein the plurality of second shift register units are on a side of the first shift register units close to the display region.

13. The display substrate of claim 1, wherein the display substrate further comprises:
- a plurality of driving signal lines configured to provide signals for the first shift register units, wherein an orthographic projection of at least one of the plurality of driving signal lines on the base substrate overlaps with an orthographic projection of the first shift register units on the base substrate;
- an orthographic projection of the plurality of driving signal lines on the base substrate do not overlap with an orthographic projection of the signal transmission lines on the base substrate; and
- at least one driving signal line of the plurality of driving signal lines is in a same layer as the signal transmission lines.

14. The display substrate of claim 1, wherein the display substrate further comprises:
- a plurality of connecting lines, each of which corresponds to one first shift register unit, and the first shift register unit is connected to the second reset line through a corresponding connecting line; except for the first shift register unit in a last stage, each of the first shift register units is connected to an input terminal of the first shift register unit in a next stage through a corresponding connecting line; and
- a plurality of first adapters, each of which corresponds to one signal transmission line, one end of the first adapter is connected to a corresponding connecting line through a first via, and the other end of the first adapter is connected to the signal transmission line through a second via.

15. The display substrate of claim 14, wherein each of the first shift register units comprises a plurality of transistors, and an orthographic projection of each of the first via and the second via on the base substrate does not overlap with an orthographic projection of the plurality of transistors on the base substrate.

16. The display substrate of claim 14, wherein the plurality of first adapters are arranged along the first direction;

the plurality of connecting lines and the second reset lines are in the same layer, and the plurality of connecting lines are electrically connected to the second reset line, respectively; and the signal transmission lines are on a side of a layer where the plurality of first adapters are located away from the base substrate.

17. The display substrate of claim 1, wherein the display substrate further comprises:
- a second adaptor, wherein one end of the second adaptor is connected to a corresponding signal transmission line through a third via, and the other end of the second adaptor is connected to a corresponding first reset line through a fourth via;
- wherein each of the first shift register units comprises a plurality of transistors, and an orthographic projection of the third vias and the fourth vias on the base substrate does not overlap with an orthographic projection of the plurality of transistors on the base substrate; and
- the plurality of second adapters are arranged along the first direction.

18. A display apparatus, comprising the display substrate of claim 1.

19. A method for manufacturing a display substrate, wherein the display substrate comprises a display region and a peripheral region, the display region comprises N rows of pixel regions arranged along a first direction, wherein the method comprises:
- forming a plurality of first reset lines and a plurality of second reset lines on a base substrate, wherein each row of pixel regions corresponds to one first reset line and one second reset line; and
- forming (N+M) first shift register units on the base substrate at a position corresponding to the peripheral region; wherein the (N+M) first shift register units are arranged along the first direction, and an output terminal of an $i^{th}$ first shift register unit is connected to a first reset line corresponding to an $(i-M)^{th}$ row of pixel regions; an output terminal of a $j^{th}$ first shift register unit is connected to a second reset line corresponding to a $j^{th}$ row of pixel regions through a signal transmission line; N is an integer greater than 2, M is a preset positive integer, $M+1 \leq i \leq N+M$, $1 \leq j \leq N$, i and j are integers, and N is greater than M; and
- wherein an orthographic projection of the signal transmission line on the base substrate overlaps with an orthographic projection of at least one of the first shift register units on the base substrate.

20. The method of claim 19, wherein the method further comprises:
- forming a plurality of driving signal lines for providing signals for the plurality of first shift register units, wherein an orthographic projection of at least one of the plurality of driving signal lines on the base substrate overlaps with orthographic projections of the first shift register units on the base substrate;
- wherein at least one of the plurality of driving signal lines and the signal transmission line are simultaneously formed.

* * * * *